United States Patent
Scott

(10) Patent No.: US 11,621,946 B2
(45) Date of Patent: Apr. 4, 2023

(54) METHOD AND SYSTEM FOR SECURE SHARING OF AERIAL OR SPACE RESOURCES USING MULTILAYER ENCRYPTION AND HOSTED PAYLOADS

(71) Applicant: The Boeing Company, Chicago, IL (US)

(72) Inventor: James P. Scott, Manhattan Beach, CA (US)

(73) Assignee: The Boeing Company, Chicago, IL (US)

(*) Notice: Subject to any disclaimer, the term of this patent is extended or adjusted under 35 U.S.C. 154(b) by 621 days.

(21) Appl. No.: 16/696,458

(22) Filed: Nov. 26, 2019

(65) Prior Publication Data

US 2021/0160228 A1    May 27, 2021

(51) Int. Cl.
| | |
|---|---|
| *H04L 9/40* | (2022.01) |
| *H04W 4/44* | (2018.01) |
| *H04W 4/02* | (2018.01) |
| *H04W 12/04* | (2021.01) |
| *G07C 5/00* | (2006.01) |

(52) U.S. Cl.
CPC ......... *H04L 63/0478* (2013.01); *G07C 5/008* (2013.01); *H04W 4/025* (2013.01); *H04W 4/44* (2018.02); *H04W 12/04* (2013.01)

(58) Field of Classification Search
CPC .... H04L 63/0478; G07C 5/008; H04W 4/025; H04W 4/44; H04W 12/04; H04W 12/03; H04W 4/40; H04B 7/1851; H04B 7/18515; H04B 7/18519; G06F 21/606; G06F 21/6209
See application file for complete search history.

(56) References Cited

U.S. PATENT DOCUMENTS

| | | | |
|---|---|---|---|
| 6,263,466 B1* | 7/2001 | Hinedi | H04L 1/0053 714/755 |
| 10,652,220 B1* | 5/2020 | Ramanujan | H04W 4/44 |
| 2015/0244632 A1* | 8/2015 | Katar | H04B 3/54 370/230 |

FOREIGN PATENT DOCUMENTS

| | | | |
|---|---|---|---|
| EP | 2881331 | 6/2015 | |
| EP | 3136680 | 3/2017 | |
| KR | 20140078192 | 6/2014 | |
| WO | WO-2018103926 A1 * | 6/2018 | ........... B64C 39/024 |

OTHER PUBLICATIONS

Roy-Chowdhury et al.: "Security Issues in Hybrid Networks with a Satellite Component", IEEE Wireless Communications, Coordinated Science Laboratory, Dept. Electrical and Computer Engineering; University of Illinois at Urbana-Champaign, U.S., vol. 12, No. 6, Dec. 1, 2005 (Dec. 1, 2005), pp. 50-61.

* cited by examiner

*Primary Examiner* — Mohammed Waliullah
(74) *Attorney, Agent, or Firm* — Haynes and Boone, LLP

(57) ABSTRACT

A method and system for providing secure aerial or space communications. A general payload and a hosted payload are provided on a vehicle. The hosted payload encrypts a data packet that contains restricted data using a secure key to create an encrypted packet. The general payload encrypts the encrypted packet using a general key to create a multilayer-encrypted packet. The multilayer-encrypted packet is transmitted from the vehicle to a destination.

33 Claims, 16 Drawing Sheets

METHOD AND SYSTEM FOR SECURE SHARING OF AERIAL OR SPACE RESOURCES USING MULTILAYER ENCRYPTION AND HOSTED PAYLOADS

FIELD

This disclosure generally relates to communication systems and, more particularly, to methods and systems for easily and efficiently providing secure sharing of aerial or space resources using multiple encryption and hosted payloads.

BACKGROUND

Vehicles, such as satellites and aerial vehicles, may be used to perform or facilitate different types of missions including, but not limited to, communications, surveillance, sensing, measurement, imaging, image processing, or a combination thereof. Different missions may require different levels of security. Further, entities that own, control, or manage satellites may require different levels of security for the data that is sent to and from these satellites.

For example, commercial-grade satellites or aerial vehicles (AVs) may be used to provide communications at a commercial-grade security level. A commercial-grade security level may be a lower security level than, for example, a government-grade security level. And therefore, commercial-grade security may be unsuitable for use by governmental agencies such as, for example, the Department of Defense and National Security Agency. A governmental agency that requires a higher security level for its secure communications may use an independent satellite or aerial vehicle network. But providing, using, and maintaining independent satellite and aerial vehicle network infrastructure may be more expensive and require more resources than desired over time.

Thus, in certain situations, it may be desirable to use existing commercial-grade satellite or aerial vehicle architecture for secure communications. For example, a governmental agency may use a secure token system or semaphore system to pass command and control of a commercial-grade satellite or aerial vehicle between the commercial service provider and the governmental agency. But this type of "hand-off" of command and control means that only one of the commercial service provider and the governmental agency may monitor and control the satellite resources during a given time period. Therefore, it may be desirable to have one or more methods or systems that take into account the issues described above.

SUMMARY

In one illustrative example, a method is provided for providing secure aerial or space communications. A general payload and a hosted payload are provided on a vehicle. The hosted payload encrypts a data packet that contains restricted data using a secure key to create an encrypted packet. The general payload encrypts the encrypted packet using a general key to create a multilayer-encrypted packet. The multilayer-encrypted packet is transmitted from the satellite to a destination.

In another illustrative example, a method is provided for providing secure aerial or space communications. A satellite having a general payload and a hosted payload receives a multilayer-encrypted packet. The general payload decrypts the multilayer-encrypted packet using a general key to reveal an encrypted packet and a general header for the encrypted packet. The general payload determines that the encrypted packet is to be routed to the hosted payload based on contents of the general header. The general payload relays the encrypted packet to the hosted payload. The hosted payload decrypts the encrypted packet using a secure key to reveal a data packet containing restricted data.

In yet another illustrative example, a system comprises a vehicle and a secure operations center. The vehicle comprises a hosted payload holding a secure key for a first level of encryption and decryption and a general payload holding a general key for a second level of encryption and decryption. The secure key is only accessible on the vehicle by the hosted payload. The secure operations center holds the secure key. The hosted payload of the vehicle and the secure operations center exchange restricted data using multilayer encryption.

In still yet another illustrative example, a system comprises a vehicle, a ground operations center, and a secure operations center. The vehicle has a payload. A portion of the payload is partitioned to define a virtual hosted payload and a virtual general payload. The ground operations center includes an enclave. The secure operations center exchanges restricted data with the virtual hosted payload via the enclave of the ground operations center.

In another illustrative example, a method is provided for exchanging restricted data between a secure operations center and a satellite. A portion of a payload of the satellite is partitioned to define a virtual hosted payload and a virtual general payload. The restricted data is communicated between the virtual hosted payload and the secure operations center via an enclave of a ground operations center.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the example embodiments are set forth in the appended claims. The example embodiments, however, as well as a preferred mode of use, further objectives and features thereof, will best be understood by reference to the following detailed description of an example embodiment of the present disclosure when read in conjunction with the accompanying drawings.

DETAILED DESCRIPTION

Figure 1:
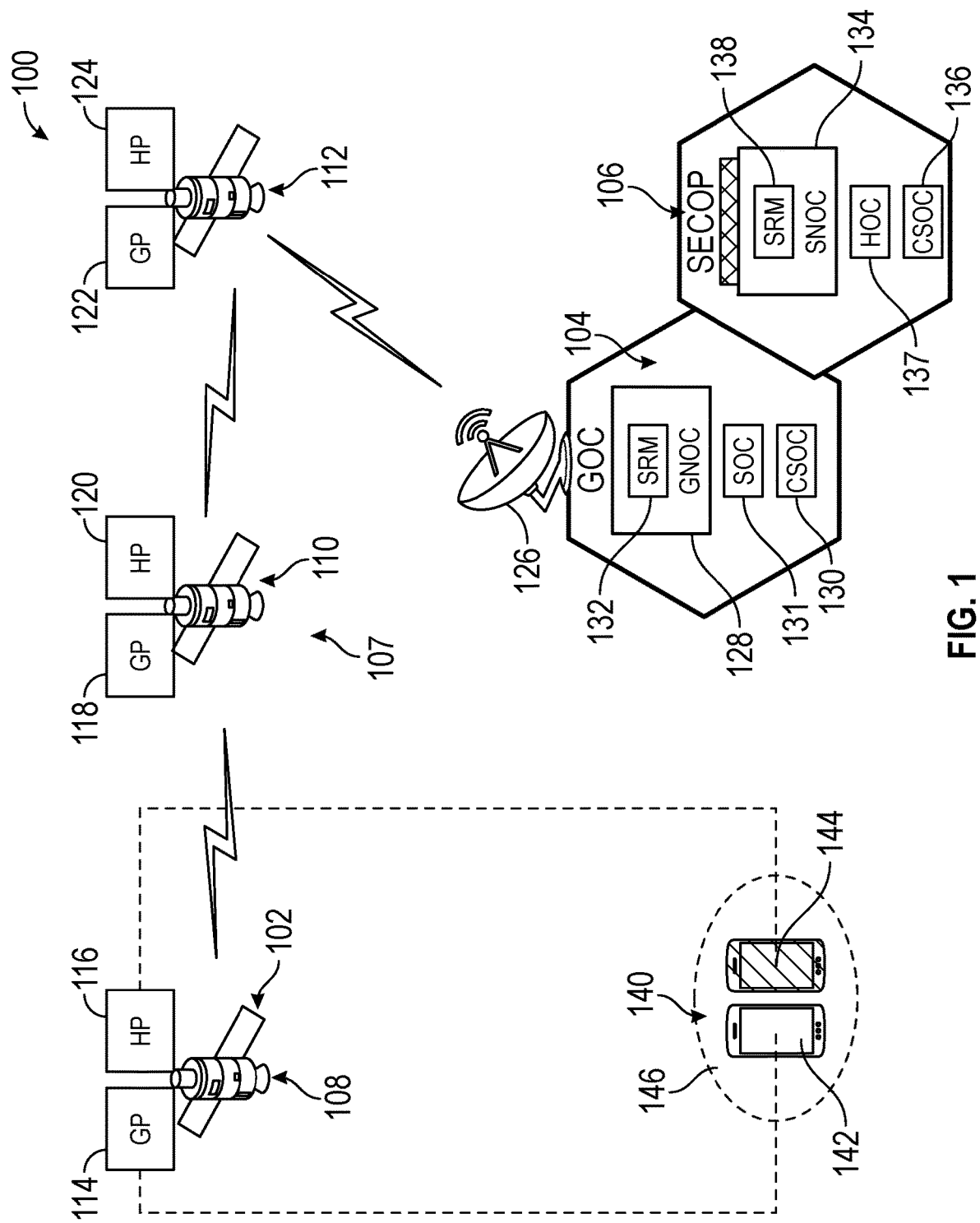
FIG. 1 is an illustration of a network in accordance with an example embodiment.

The example embodiments described below provide methods and systems for providing secure communications using physical or virtual hosted payloads. In particular, the example embodiments provide methods and systems that enable a secure entity, such as a governmental agency, to use a commercial vehicle system and, in particular, a commercial aerial or space vehicle system, for communications that require higher levels of security than commercial-grade security.

A commercial air or space vehicle system includes one or more vehicles. As used herein, a "vehicle" may take the form of a space vehicle, an aerial vehicle, or an aerospace vehicle. Accordingly, a commercial air or space vehicle system may include one or more space vehicles, one or more aerial vehicles (AVs), one or more aerospace vehicles, or a combination thereof. A space vehicle is a vehicle capable of operating (e.g., orbiting) in space. A satellite is an example of one type of space vehicle. An aerial vehicle is a vehicle capable of operating (e.g., flying, hovering) in air. An aerial vehicle may be, for example, but is not limited to, an unmanned aerial vehicle (UAV), a manned aerial vehicle, or a high-altitude aerial platform. An aerospace vehicle is a vehicle capable of operating (e.g., flying) in both air and space.

The methods and systems described herein allow for secure communications over a commercial air or space vehicle system with three different types of data traffic. With the first type of data traffic, data may be sent from a secure user terminal (e.g., a secure user smartphone, laptop, mobile terminal, or fixed terminal), processed by one or more hosted payloads on one or more respective vehicles (e.g., one or more satellites, one or more aerial vehicles, or both), and forwarded to a destination user terminal. With the second type of data traffic, data may be sent from a secure user terminal, processed by one or more hosted payloads on one or more respective vehicles, and sent to a network operations center (NOC). With the third type of data traffic, telemetry data may be collected and processed by the hosted payload on a satellite and then sent to a vehicle operations center (e.g., a satellite operations center, an aerial vehicle operations center) for processing or forwarding to a network operations center.

In one or more illustrative examples, multilayer encryption is used to provide secure communications via a commercial air or space vehicle system. The commercial air or space vehicle system may include, for example, satellites, aerial vehicles, or both that are used for different types of missions including, but not limited to, communications, image processing, sensing, measurement, data collection, surveillance, or a combination thereof. When the commercial air or space vehicle system includes only satellites, it may be referred to as a commercial satellite system. When the commercial air or space vehicle system includes only aerial vehicles, it may be referred to as a commercial aerial vehicle system.

Multilayer encryption includes two or more levels or layers of encryption. When two layers of encryption are used, this encryption is referred to as double encryption. In these illustrative examples, double encryption includes one layer of encryption via a secure key and another layer of encryption via a general key.

For example, a secure entity may use a specifically designated hosted payload on a commercial satellite or aerial vehicle in which the hosted payload has access to a secure key for encryption and decryption to handle secure communications. This hosted payload may be a physical hosted payload that is separate and distinct from the physical general (or commercial) payload on the commercial satellite. The general payload of the satellite aerial vehicle has access to a general key for encryption and decryption but is not given access to the secure key. Having two separate and distinct payloads on the commercial satellite aerial vehicle enables double encryption, which provides the level of security needed to allow the secure entity to use the commercial aerial or space vehicle system.

As one illustrative example, a network of satellites or aerial vehicles and a secure operations center may use double encryption in the user plane, the control and management plane, or both to exchange restricted data. As used herein, "restricted data" is data that is intended for restricted or limited viewing, use, processing, or a combination thereof. For example, restricted data may include data that is classified, data that is supposed to be accessible by only those with a selected level of clearance or authorization, data that is meant to be kept confidential or secret, data that is not intended for commercial use, or a combination thereof.

The secure operations center may encrypt restricted, which may comprise classified or sensitive data, to form encrypted data. The secure operations center then sends the encrypted data to a network operations center that adds another level of encryption to the encrypted data before transmitting the now double-encrypted data to a destination satellite in a satellite system. Additional layers or levels of encryption may be added, as required. The satellite or aerial vehicle includes two distinct and independently managed payloads: a general payload that holds a general key to one level of encryption and a hosted payload that holds a secure key to the other level of encryption.

The multilayer encryption described above ensures that only the secure entity is ever able to view the restricted data. This type of communications setup is used when the communications network is not a trusted network. In other words, the secure entity may not "trust" the commercial entity or entities managing the satellites. Alternatively, the commercial entity or entities may not have clearance to view the restricted data.

In some cases, the network of satellites or aerial vehicles may be a trusted network. The secure entity and the entity may have an agreement in place that allows the commercial entity to view and process at least some portion of the restricted data. For example, the satellites or aerial vehicles may be managed by a coalition partner network (e.g., NATO) or a commercial entity that has been vetted for handling specific types of traffic, such as Sensitive But Unclassified (SBU) or For Official Use Only (FOUO) data. In these illustrative examples, the payload of a satellite or aerial vehicle may simply be partitioned to define a virtual hosted payload, at least some portion of which is designated to be managed by the secure entity. Thus, a separate and distinct physical payload may not be needed.

The example embodiments also recognize that it may be desirable to allow commercial user devices and secure user devices that are geographically co-located to communicate simultaneously with a satellite or aerial vehicle. In one illustrative example, this type of simultaneous communication is provided by isolating the commercial communications from the secure communications via diversity in at least one of a frequency domain, a time domain, or a coding domain.

Referring now to the figures, FIG. 1 is an illustration of a network in accordance with an example embodiment. Network 100, which may also be referred to as a network system or a system, includes aerial or space vehicle system 102, ground operations center (GOC) 104, and secure operations center (SECOP) 106. Ground operations center 104 and secure operations center 106 may both be located on ground. In some cases, ground operations center 104 may be referred to as a ground gateway. Aerial or space vehicle system 102 may include any number of vehicles (i.e., aerial vehicles, space vehicles, or aerospace vehicles). When aerial or space vehicle system 102 includes multiple vehicles, these vehicles may be referred to as a vehicle constellation. For example, when aerial or space vehicle system 102 includes multiple satellites, these satellites may be referred to as a satellite constellation. The vehicles in aerial or space vehicle system 102 may communicate via radio frequency signals, cellular signals, or optical signals.

Aerial or space vehicle system 102, is a commercial-grade aerial or space vehicle system that includes plurality of vehicles 107. In these illustrative examples, plurality of vehicles 107 includes satellite (or some other vehicle) 108, satellite (or some other vehicle) 110, and satellite (or some other vehicle) 112. When plurality of vehicles 107 includes only satellites, aerial or space vehicle system 102 may be referred to as a satellite system.

Each of satellites 108, 110, and 112 includes at least two payloads. A "payload" is a physical set of resources and equipment used by a vehicle to perform communications. For example, a payload may include, but is not limited to, any number of antennas (e.g., phased array antennas), beam formers, communications channels, amplifiers, other types of communications equipment, or a combination thereof.

Satellite 108, satellite 110, and satellite 112 may be used for communications, image processing, sensing, measurement, data collection, surveillance, or a combination thereof. Satellite 108, satellite 110, and satellite 112 are generally owned and operated by one or more general entities. A "general entity" may be an entity that does not require a higher level of security than commercial-grade security for its communications. For example, a general entity may be a commercial entity (e.g., a commercial service provider) or some other entity that requires a low level of encryption or no encryption for its communications.

Satellite 108 includes general payload 114 and hosted payload 116, each of which is a distinct physical payload that is managed independently of the other. Satellite 110 includes general payload 118 and hosted payload 120, each of which is a distinct physical payload that is managed independently of the other. Satellite 112 includes general payload 122 and hosted payload 124, each of which is a distinct physical payload that is managed independently of the other. A "general payload," such as general payload 114, general payload 118, and general payload 122, is a payload that is managed by a general entity. Each of general payload 114, general payload 118, and general payload 122 includes communications security equipment (COMSEC), cryptographic equipment, or both.

A "hosted payload," such as hosted payload 116, hosted payload 120, and hosted payload 124, is a payload that is hosted by a satellite (or some other vehicle) owned by a general entity but that is managed by a secure entity. Each of hosted payload 116, hosted payload 120, and hosted payload 124 includes communications security equipment (COMSEC), cryptographic equipment, or both. A "secure entity" may be an entity that requires a higher level of security than commercial-grade security for its communications. For example, a secure entity may be a governmental entity such as, but not limited to, the Department of Defense (DoD), the Department of Homeland Security (DHS), the National Security Agency (NSA), the Central Intelligence Agency (CIA), or some other type of governmental organization, agency, or other entity.

Ground operations center 104 may be a global ground operations center that is managed by the general entity. Ground operations center 104 may include, for example, antenna system 126, general network operations center 128, cybersecurity operations center (CSOC) 130, and satellite operations center (SOC) (or some other vehicle operations center such as, for example, an aerial vehicle operations center or an aerial vehicle payload operations center) 131. Antenna system 126 may include any number of antennas such as, but not limited to, phased array antennas. General network operations center 128 includes system resource manager (SRM) 132.

Secure operations center 106 is managed by the secure entity. Secure operations center 106 is in communication with ground operations center 104. Secure operations center 106 may include, for example, secure network operations center (SNOC) 134, cybersecurity operations center 136, and hosted operations center 137 (HOC). Secure network operations center 134 includes system resource manager (SRM) 138.

In these illustrative examples, the secure entity that manages secure operations center 106, hosted payload 116, hosted payload 120, and hosted payload 124 communicates through network 100 using multilayer encryption. The secure entity may not consider network 100 a "trusted network." Accordingly, the secure entity may use multilayer encryption for communications through network 100 to ensure that restricted data is not accessible by the general entity. For example, multilayer encryption is used to prevent ground operations center 104, general payload 114, general payload 118, and general payload 122 from accessing this restricted data.

As one illustrative example, the secure entity uses double-encryption to provide secure communications in the data plane (which may be also referred to as the user plane), the control plane, the management plane, or a combination thereof for network 100. The data plane carrier user traffic (e.g., mission data). The control plane manages the topology of the overall system. The management plane monitors the overall system configuration. The management plane may sometimes be considered part of the control plane—e.g., the control and management plane.

The double-encryption requires the use of at least two keys: a general key and a secure key. A key, as used herein, may include any number of individual keys. For example, a key may be an integrated encryption and decryption key or may include both an encryption key and decryption key. Each of these keys provides a different level or layer of encryption. The general entity originates, disseminates, and manages the general key. For example, the general entity originates the general key and disseminates the general key to ground operations center 104, general payload 114 of satellite 108, general payload 118 of satellite 110, and general payload 122 of satellite 112.

The secure entity originates, disseminates, and manages the secure key. For example, the secure entity originates the secure key and disseminates the secure key to secure operations center 106, hosted payload 116 of satellite 108, hosted payload 120 of satellite 110, and hosted payload 124 of satellite 112. Ground operations center 104, general payload 114, general payload 118, and general payload 122 are not allowed access to the secure key. In other examples, other keys may be used to provide other layers or levels of encryption.

In one illustrative example, satellite 110 sends restricted data to secure operations center 106 via double-encryption. The restricted data may be transmitted using any number of data packets. For example, hosted payload 120 on satellite 110 uses the secure key to encrypt the restricted data in a data packet to form an encrypted packet. Hosted payload 120 then routes the encrypted packet to general payload 118. General payload 118 further encrypts the encrypted packet using the general key to form a multilayer-encrypted packet, which in these examples takes the form of a double-encrypted packet. Thus, the double-encrypted packet has both an outer and inner level, or layer, of encryption.

General payload 118 then transmits the double-encrypted packet from satellite 110 through network 100. The double-encrypted packet is transmitted directly to or through one or more other satellites (or other vehicles) in aerial or space vehicle system 102 to ground operations center 104. In some cases, the one or more other satellites may be "relay satellites" (or "relay vehicles") with traffic traversing aerial or space vehicle system 102 via inter-satellite links (ISLs) (or inter-vehicle links).

General network operations center 128 of ground operations center 104 receives the double-encrypted packet. General network operations center 128 decrypts the outer layer of encryption using the general key to reveal the encrypted packet. General network operations center 128 then routes the encrypted packet to secure operations center 106. Secure operations center 106 decrypts the encrypted packet using the secure key, to reveal the data packet comprising the restricted data.

A process similar to the above-described process may be used to transmit restricted data from the secure operations center 106 to one of the satellites (or other vehicles) in aerial or space vehicle system 102. For example, secure operations center 106 uses the secure key to encrypt restricted data in a data packet to form an encrypted packet (also referred to as an encrypted data packet). Secure operations center 106 routes the encrypted packet to general network operations center 128 of ground operations center 104. General network operations center 128 then further encrypts the encrypted packet using the general key to form a double-encrypted packet (also referred to as a double-encrypted data packet). The double-encrypted packet has both an outer and inner level, or layer, of encryption. General network operations center 128 then transmits the double-encrypted packet through network 100 to its destination.

In one illustrative example, the destination for the double-encrypted packet is satellite 112. The double-encrypted packet may be routed directly from ground operations center 104 to satellite 112 or may be routed through one or more other satellites in aerial or space vehicle system 102 to satellite 112 using ISL interconnectivity. In some cases, the one or more other satellites may be referred to as "relay satellites." When satellite 112 receives the double-encrypted packet, general payload 122 uses the general key to decrypt the outer layer of encryption and thereby reveal the encrypted packet. General payload 122 then relays the encrypted packet to hosted payload 124. Hosted payload 124 decrypts the encrypted packet using the secure key to reveal the data packet comprising the restricted data.

Because the general payloads and the hosted payloads in satellites 108, 110, and 112 are independently managed and operated, secure communications (e.g., communications secured via double-encryption) and commercial-grade communications may occur simultaneously within network 100. There is no need for a token or semaphore system or a handoff of resources.

Communications may also be provided between aerial or space vehicle system 102 and one or more terminals. A terminal may be a device, such as one of devices 140. Devices 140 may be considered part of or connected to network 100. In one illustrative example, devices 140 are user devices located on ground. In this illustrative example, devices 140 include user device 142 and secure user device 144. User device 142 may be, for example, a commercial user device that exchanges data with aerial or space vehicle system 102 using commercial-grade security. Secure user device 144 may be, for example, a government device that requires a higher level of security, such as government-grade security. Both user device 142 and secure user device 144 are smartphones in this illustrative example. In other examples, however, one or both of these user devices may be a computer, a laptop, a smartwatch, a tablet, a biometric device, a digital camera or camcorder, or some other type of device.

In one illustrative example, both user device 142 and secure user device 144 are able to simultaneously or near-simultaneously communicate with aerial or space vehicle 102 from a generally same geographic location 146. Communications between aerial or space vehicle system 102 and user device 142 and communications between aerial or space vehicle system 102 and secure user device 144 are isolated via diversity in at least one of the frequency domain, the time domain, or the coding domain. For example, user device 142 may be able to communicate with satellite 108 at the same time that secure user device 144 communicates with satellite 108. In particular, even though user device 142 and secure user device 144 may be geographically co-located at geographic location 146, communications to and from each may be isolated by using non-overlapping portions of at least one, of the frequency domain, the time domain, or the coding domain.

Figure 2:
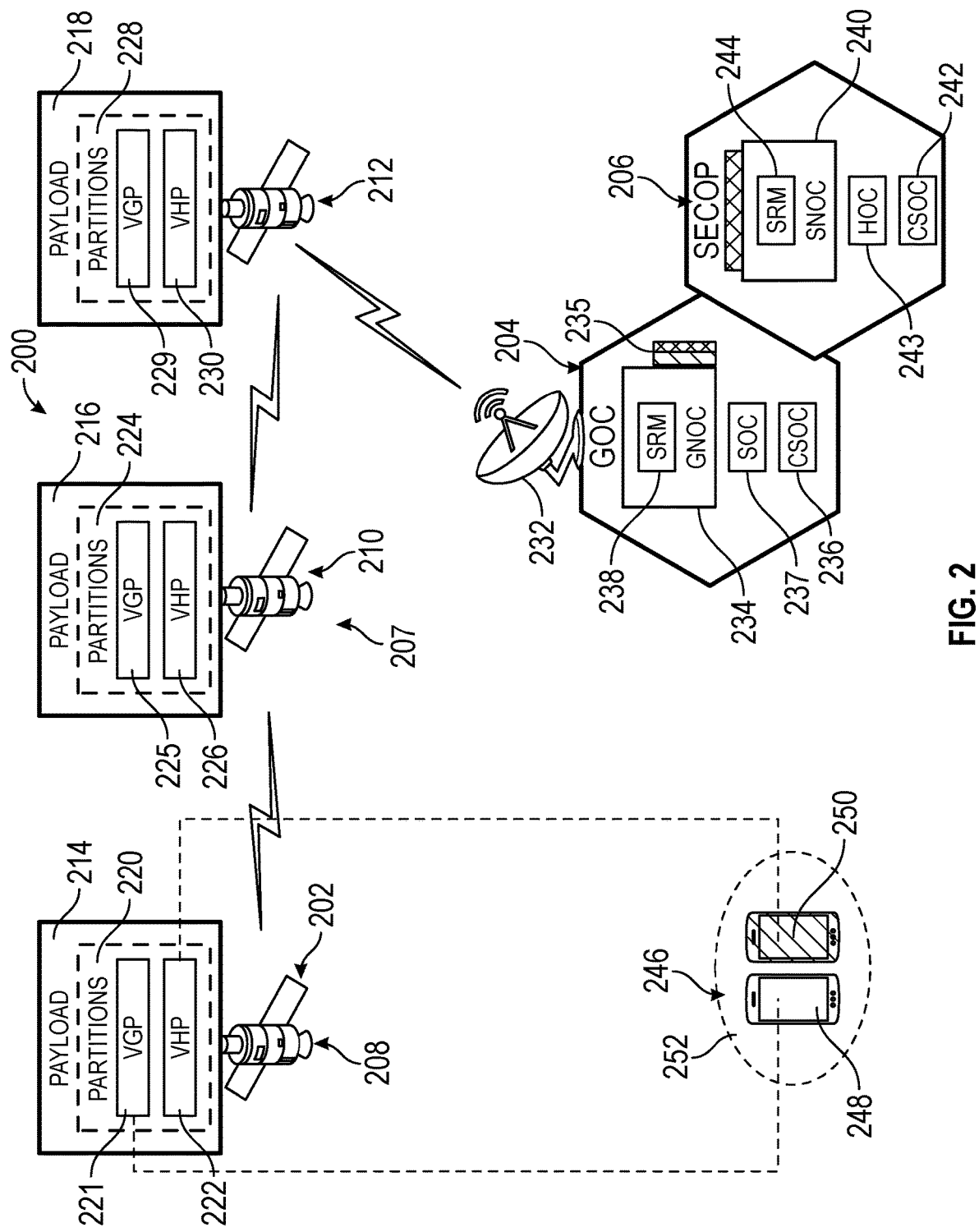
FIG. 2 is an illustration of a different configuration for a network in accordance with an example embodiment.

FIG. 2 is an illustration of a different configuration for a network in accordance with an example embodiment. In this illustrative example, network 200, which may also be referred to as a network system or a system, includes aerial or space vehicle system 202, ground operations center (GOC) 204, and secure operations center (SECOP) 206. Aerial or space vehicle system 202 may include one or more vehicles (e.g., satellites, aerial vehicles, or aerospace vehicles). Aerial or space vehicle system 202 includes plurality of vehicles 207. In these illustrative examples, plurality of vehicles 207 includes satellite (or some other vehicle) 208, satellite (or some other vehicle) 210, and satellite (or some other vehicle) 212.

A secure entity manages secure operations center 206. The secure entity may consider network 200 a "trusted network" or a "trusted system." Because network 200 is a trusted network, the secure entity may be able to use some portion of the resources and equipment in aerial or space vehicle system 202 for secure communications. In this illustrative example, the secure communications provided to the secure entity via network 200 may be at a lower level of security than the secure communications provided to the secure entity via network 100 in FIG. 1. For example, double-encryption may not be needed for sending secure communications to and from vehicles in plurality of vehicles 207 through network 200.

In this illustrative example, the satellites in aerial or space vehicle system 202 each include a single physical payload. Satellite 208 includes payload 214, satellite 210 includes payload 216, and satellite 212 includes payload 218. Each of these payloads may be partitioned into a plurality of partitions. Each partition includes a designated portion of the resources and equipment that form the payload. For example, payload 214 may include a phased array antenna that includes about 1,000 phased array elements. Payload 214 may be partitioned such that about 256 of these elements are designated to be managed by the secure entity and used for secure communications.

For example, payload 214 may be partitioned to form at least two partitions 220, which define virtual general payload 221 and virtual hosted payload 222. Similarly, payload 216 may be partitioned into at least two partitions 224, which define virtual general payload 225 and virtual hosted payload 226. Further, payload 218 may be partitioned into at least two partitions 228, which define virtual general payload 229 and virtual hosted payload 230.

Virtual hosted payload 222, virtual hosted payload 226, and virtual hosted payload 230 are managed by the secure entity. Virtual general payload 221, virtual general payload 225, and virtual general payload 229 are managed by the general entity. In some cases, payload 214, payload 216, payload 218, or a combination thereof may be partitioned into multiple partitions in which one partition is the virtual general payload and other partitions define other virtual hosted payloads managed by different secure entities.

Ground operations center 204 may be a global ground operations center that is managed by a general entity. Ground operations center 204 may also be referred to as a ground gateway. Ground operations center 204 may include, for example, antenna system 232, general network operations center (GNOC) 234, enclave 235, cybersecurity operations center (CSOC) 236, and satellite operations center (SOC) (or some other vehicle operations center such as, for example, an aerial vehicle operations center or an aerial vehicle payload operations center) 237. Antenna system 232 may include any number of antennas such as, but not limited to, phased array antennas. Ground network operations center 234 includes system resource manager (SRM) 238.

Secure operations center 206 is managed by the secure entity. Secure operations center 206 is able to communicate with ground operations center 204. Secure operations center 206 may include, for example, secure network operations center (SNOC) 240, cybersecurity operations center (CSOC) 242, and hosted operations center (HOC) 243. Secure network operations center 240 includes system resource manager (SRM) 244.

Secure operations center 206 communicates with general network operations center 234 of ground operations center 204 via enclave 235. In these illustrative examples, enclave 235, which may be referred to as a secure enclave, is managed by the secure entity even though enclave 235 is co-located with operations center.

In one illustrative example, secure operations center 206 double-encrypts restricted data in a data packet using a secure key and a general key to form a double-encrypted packet. Secure operations center 206 sends the double-encrypted packet to enclave 235 for processing. Enclave 235 decrypts the double-encrypted packet using the secure key and the general key to reveal the data packet with the restricted data.

Enclave 235 then parses the data packet and identifies a destination for the data packet. Enclave 235 then encrypts the data packet using the general key to create an encrypted packet and relays the encrypted packet to general network operations center 234. This encrypted packet may also be referred to as a commercially-encrypted packet. General network operations center 234 then transmits the encrypted packet to its destination through aerial or space vehicle system 202.

The destination for the encrypted packet may be, for example, satellite 208. When satellite 208 receives the encrypted packet, payload 214 processes and decrypts the encrypted packet using the general key. In particular, virtual general payload 221 decrypts the encrypted packet to reveal the decrypted data packet and then parses the decrypted data packet to determine whether the data is to be routed to virtual hosted payload 222 for processing. For example, payload 214 may use the control and management directives included in the decrypted data packet to determine whether to route the decrypted data packet to virtual hosted payload 222.

In other illustrative examples, data packets are forwarded from satellite system 202 to secure operations center 206. For example, ground operations center 204 may receive an encrypted packet from one of the satellites in aerial or space vehicle system 202. If this encrypted packet contains telemetry data, the encrypted packet is received by satellite operations center 237 and forwarded to enclave 235. If the encrypted packet contains telemetry data, the encrypted packet is received by general network operations center 234 and forwarded to enclave 235.

Enclave 235 decrypts the encrypted packet using the general key to reveal the data packet and parses the data packet. Enclave 235 then double-encrypts the data packet using the general key and the secure key and relays the double-encrypted packet to secure operations center 206 and, in particular, secure network operations center 240.

In some cases, the encrypted packet is decrypted using the general key by satellite operations center 237 or general network operations center 234 prior to forwarding as a decrypted data packet to enclave 235. Enclave 235 parses the decrypted data packet and then double-encrypts the data packet as described above for relay to secure operations center 206.

Thus, in these illustrative examples, double-encryption is not needed within network 200 except between enclave 235 and secure operations center 206. Because the secure entity considers network 200 a trusted network, restricted data and commercial data may be transmitted through aerial or space vehicle system 202 in the same data stream, logically isolated using media access control (MAC) and link layer control (LLC) or network layer (e.g., Internet Protocol-based) tunneling techniques.

Similar to devices 140 in FIG. 1, secure communications may also be provided between aerial or space vehicle system 202 and devices 246. Devices 246 may be, for example, user devices located on ground. In this illustrative example, devices 246 include user device 248 and secure user device 250. User device 248 may be, for example, a commercial user device that exchanges data with aerial or space vehicle system 202 using commercial-grade security. Secure user device 250 may be, for example, a government device that requires a higher level of security, such as government-grade security. Both user device 248 and secure user device 250 are smartphones in this illustrative example. In other examples, however, one or both of these user devices may be a computer, a laptop, a smartwatch, a tablet, a biometric device, a digital camera or camcorder, or some other type of device.

In one illustrative example, both user device 248 and secure user device 250 are able to simultaneously or near-simultaneously communicate with aerial or space vehicle system 202 from a generally same geographic location 252. Communications between aerial or space vehicle system 202 and user device 248 and communications between aerial or space vehicle system 202 and secure user device 250 are isolated via diversity in at least one of the frequency domain, the time domain, or the coding domain. For example, user device 248 may be able to communicate with satellite 210 at the same time that secure user device 250 communicates with satellite 210. In particular, even though user device 248 and secure user device 250 are geographically co-located at geographic location 252, communications to and from each may be isolated by using non-overlapping portions of at least one of the frequency domain, the time domain, or the coding domain.

Although aerial or space vehicle system 102 in FIG. 1 and aerial or space vehicle system 202 in FIG. 2 are depicted as including satellites, these aerial or space vehicle systems may include other types of vehicles in addition to or in place of the satellites depicted. The methods and systems of sharing resources and enabling secure communications described above for satellites may be implemented in a similar manner for aerial vehicles and aerospace vehicles.

Figure 3:
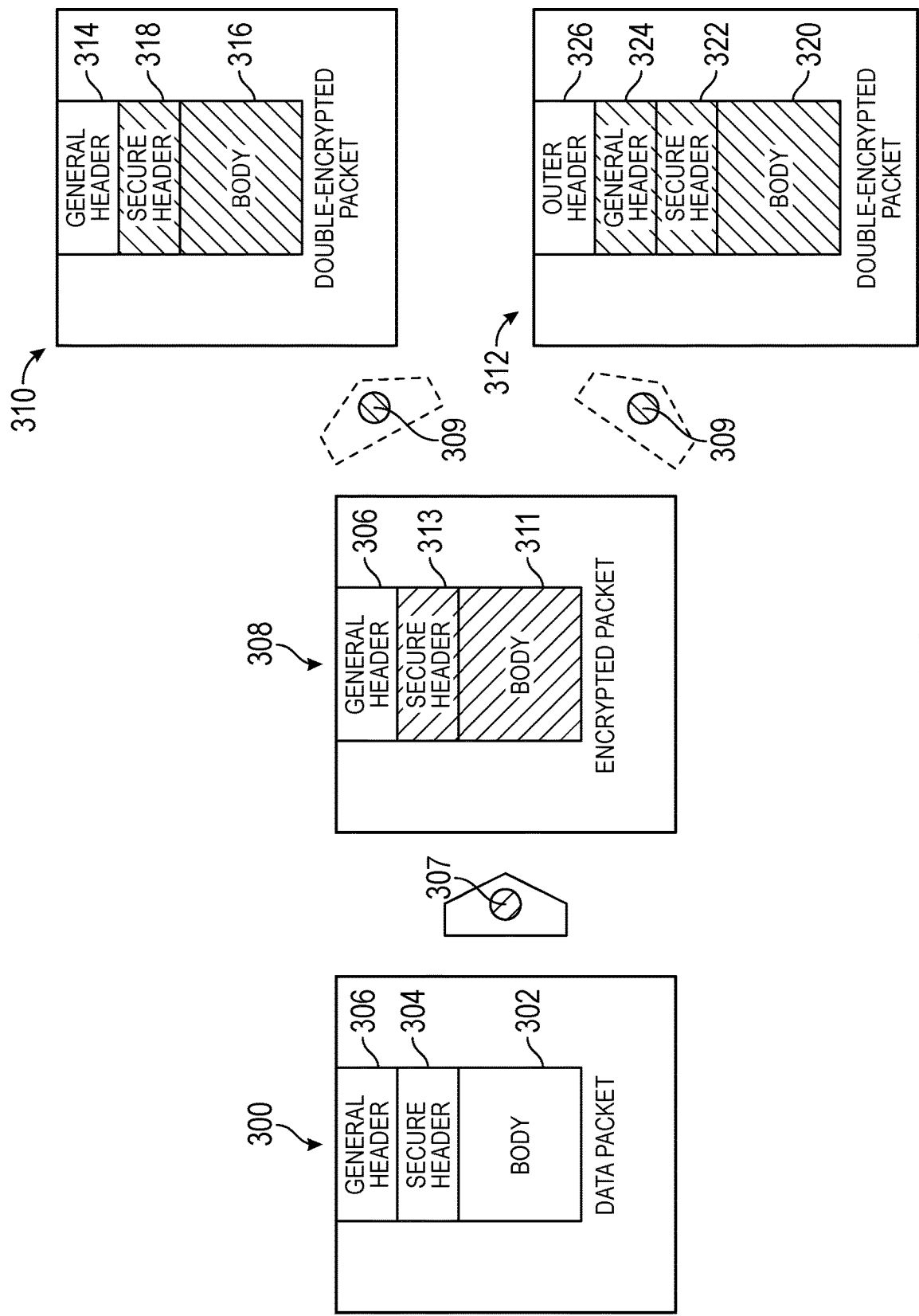
FIG. 3 is an illustration of the double-encryption of a data packet containing restricted data in accordance with an example embodiment.

FIG. 3 is an illustration of the double-encryption of a data packet containing restricted data in accordance with an example embodiment. The process of double-encryption shown in FIG. 3 may be performed by the general payload and hosted payload of a vehicle, such as a satellite of aerial or space vehicle system 102 in FIG. 1. In some cases, the double-encryption may be performed by a secure operations center, such as secure operations center 106 in FIG. 1, or a secure enclave, such as enclave 235 in FIG. 2. In other cases, the double-encryption may be performed by both a secure operations center and a ground operations center (e.g., by secure network operations center 134 of secure operations center 106 and general network operations center 128 of ground operations center 104 in FIG. 1).

In one illustrative example, data packet 300 is created by a source for transmission to a destination. The source is one managed by a secure entity. For example, the source may be secure operations center 106, hosted payload 116, hosted payload 120, or hosted payload 124 in FIG. 1.

Data packet 300 includes body 302, secure header 304, and general header 306. Body 302 contains restricted data that may include, for example, classified data. Secure header 304 includes any number of fixed and optional fields that contain addressing and other data that is required for data packet 300 to reach its intended destination. Secure header 304 is intended only for viewing by the resources and equipment managed by the secure entity.

General header 306 includes any number of fixed and optional fields that contain addressing and other data that is required for data packet 300 to reach its intended destination. The contents may include an n-tuple of fields. In one illustrative example, the contents of the general header may be a 5-tuple that includes a source Internet Protocol (IP) or Ethernet address, a destination IP or Ethernet address, a source port, a destination port, and protocol.

In one illustrative example, the source that originates data packet 300 may use secure key 307 to encrypt data packet 300 to create encrypted packet 308. In particular, body 302 and secure header 304 are encrypted such that encrypted packet 308 includes encrypted body 311 and encrypted secure header 313, but general header 306 remains encrypted. For example, body 302 and secure header 304 may be converted to cipher-text, while general header 306 remains plain-text. Encryption with secure key 307 creates the first level or layer of encryption.

The second level or layer of encryption is created using general key 309. This encryption may be performed by, for example, ground operations center 104, general payload 114, general payload 118, or general payload 122 in FIG. 1. This second encryption may be performed in at least two different ways. In a first method, general key 309 is used to create double-encrypted packet 310, and in a second method, general key 309 is used to create double-encrypted packet 312.

To create double-encrypted packet 310, the contents of general header 306 are processed in some manner but updated general header 314 remains unencrypted. For example, general header 306 may be updated to form updated general header 314 without encryption of general header 306. Updating general header 306 may include updating one or more fields of general header 306 to ensure that the data will be routed to the correct destination. For example, some network translation of general header 306 may be performed to convert between a secure IP address space and a general IP address space (or between a secure Ethernet address space and a general Ethernet space). Creating double-encrypted packet 310 also includes further encrypting (e.g., adding another layer or level of encryption) encrypted body 311 and encrypted secure header 313 of encrypted packet 308 using general key 309 to form double-encrypted body 316 and double-encrypted secure header 318, respectively.

Creating double-encrypted packet 312 includes further encrypting encrypted body 311 encrypted secure header 313 of encrypted packet 308 using general key 309 to form double-encrypted body 320 and double-encrypted secure header 322, respectively and encrypting general header 306 to form encrypted general header 324. In some illustrative examples, general header 306 is updated prior to the encryption of general header 306. In other illustrative examples, general header 306 is encrypted without any updating to form encrypted general header 324. Outer header, 326 is added to double-encrypted packet 312 with outer header 326 remaining unencrypted (e.g., plain-text).

Both double-encrypted packet 310 and double-encrypted packet 312 are considered ready for transmission through a network (e.g., network 100 in FIG. 1) that is not a "trusted network." For example, double-encrypted packet 310 and double-encrypted packet 312 are considered ready for interleaving into a satellite command data stream. The encryption discussed above in FIG. 3 is based on a packet-encryption or frame-encryption approach and may not be used for bulk encryption.

The process of forming encrypted packet 308 described above applies to the creation of any encrypted packet described herein. The process of forming double-encrypted packet 310 and double-encrypted packet 312 may applies to the creation of any double-encrypted packet described herein. Further, in other examples, other layers or levels of encryption may be added in a manner similar to the manner described above.

Figure 4:
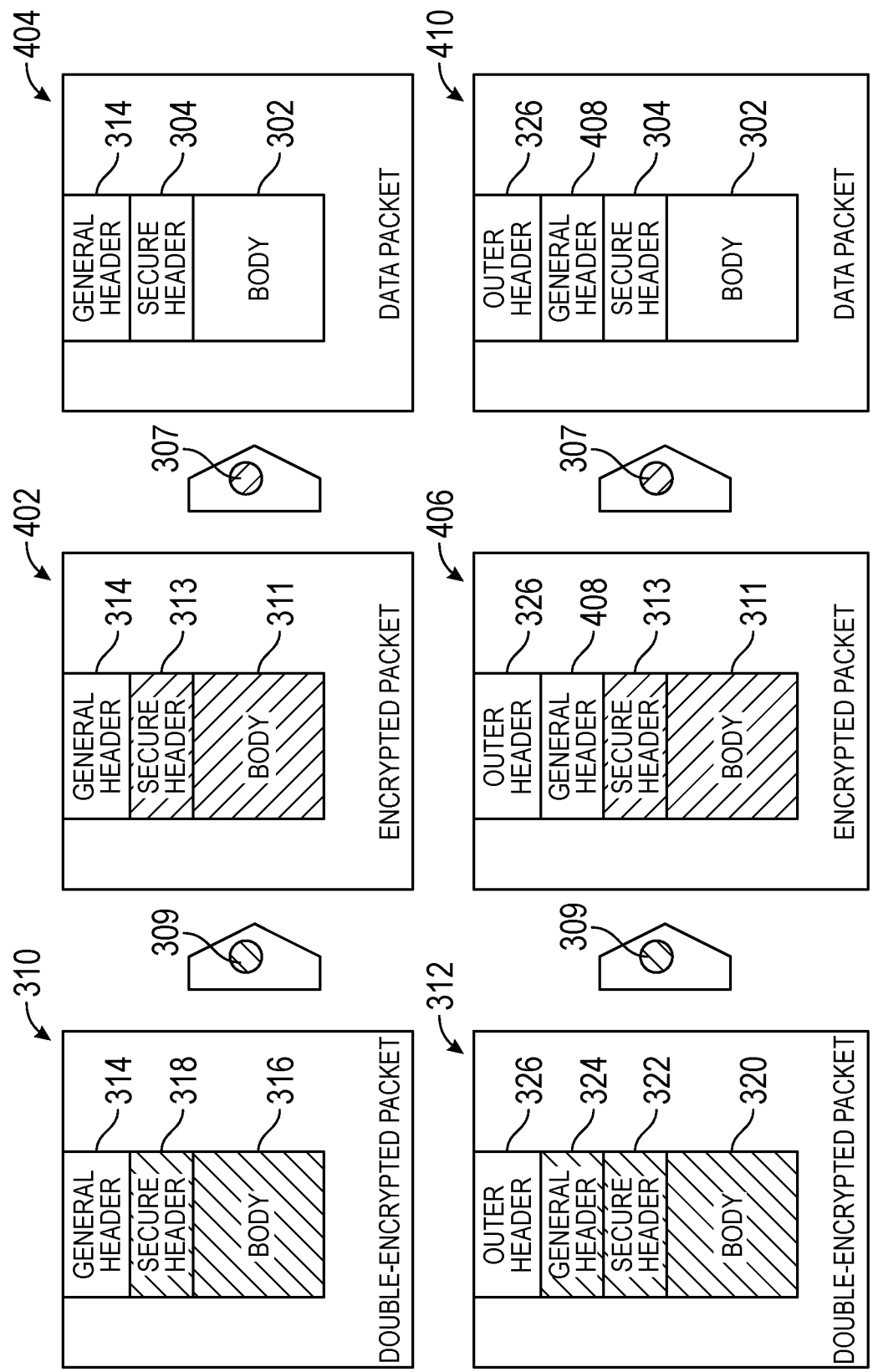
FIG. 4 is an illustration of decryption of double-encrypted packets in accordance with an example embodiment.

FIG. 4 is an illustration of decryption of double-encrypted packets in accordance with an example embodiment. The process of decryption shown in FIG. 4 may be performed by the general payload and hosted payload of a vehicle, such as a satellite of aerial or space vehicle system 102 in FIG. 1. In some cases, the decryption may be performed by a secure enclave, such as enclave 235 in FIG. 2, or secure operations center 106 in FIG. 1. In other cases, the decryption may be performed by both a secure operations center and a ground operations center (e.g., by secure network operations center 134 of secure operations center 106 and general network operations center 128 of ground operations center 104 in FIG. 1).

Double-encrypted packet 310 from FIG. 3 is decrypted using general key 309 to reveal encrypted packet 402. Encrypted packet 402 may be the same as encrypted packet 308 in FIG. 3 but with updated general header 314 of double-encrypted packet 310. Encrypted packet 402 is further decrypted using secure key 307 to reveal data packet 404 (also referred to as a decrypted data packet). Data packet 404 is the same as data packet 300 in FIG. 3 but with updated general header 314.

Double-encrypted packet 312 from FIG. 3 is decrypted using general key 309 to reveal encrypted packet 406. Encrypted packet 406 may be the same as encrypted packet 308 in FIG. 3 but with outer header 326. Further, encrypted packet 406 has general header 408, which may be the same as general header 306 in FIG. 3 or an updated version of general header 306. Encrypted packet 406 is decrypted using secure key 307 to reveal data packet 410 (also referred to as a decrypted data packet). Data packet 410 is the same as data packet 300 from FIG. 3, but with outer header 326. Further, data packet 410 includes general header 408, which may be the same as or an updated version of general header 306 from FIG. 3.

The decryption processes used to decrypt double-encrypted packet 310 to reveal encrypted packet 402 and to decrypt double-encrypted packet 312 to reveal encrypted packet 406 may apply to the decryption of any of the double-encrypted packets described herein. The decryption processes used to decrypt encrypted packet 402 to reveal data packet 404 and to decrypt encrypted packet 406 to reveal data packet 410 may apply to the decryption of any of the encrypted packets described herein. Further, in other examples, other layers or levels of encryption may be decrypted in a manner similar to the manner described above.

Figure 5A:
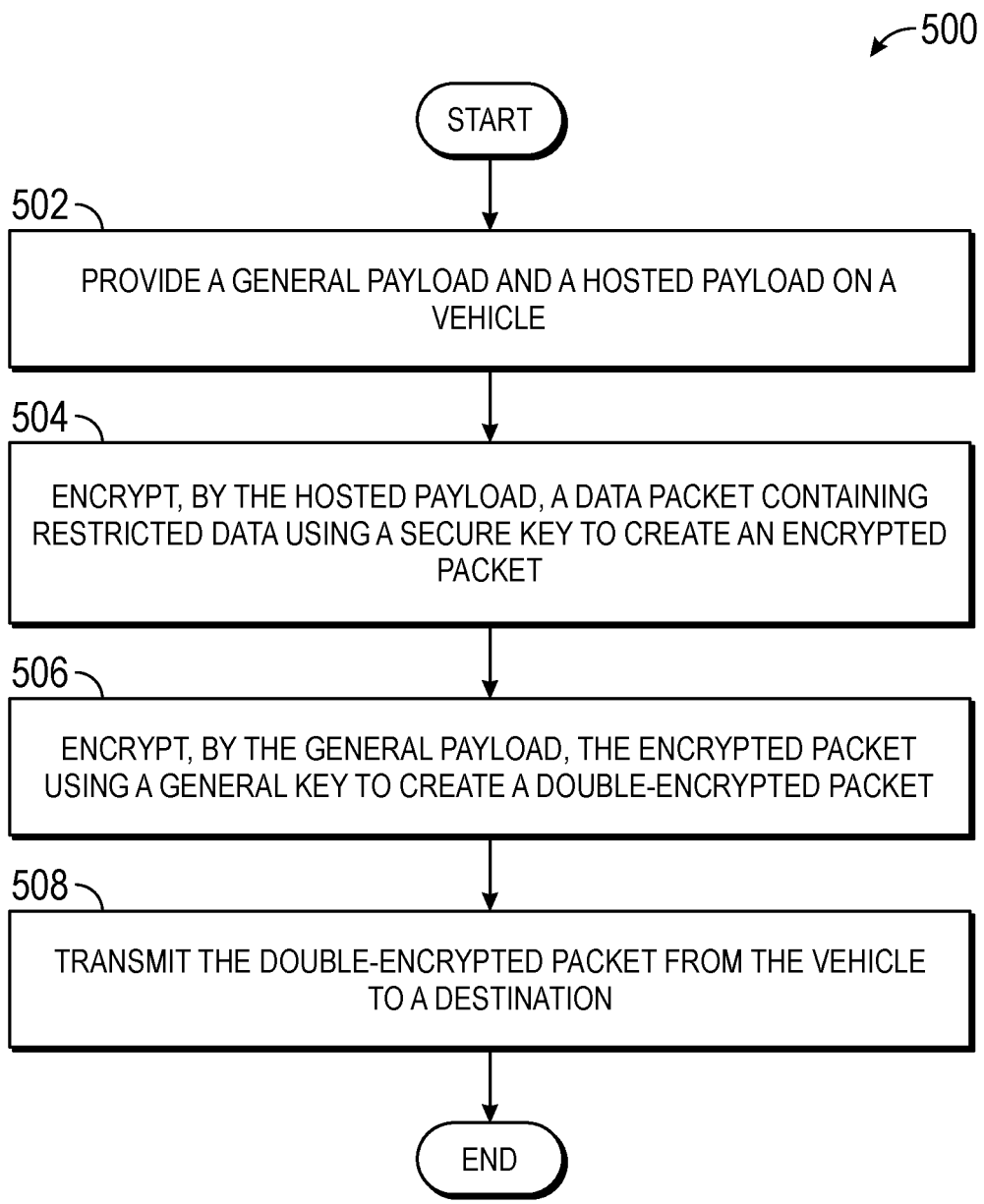
FIG. 5A is a flowchart of a process for providing secure communications in accordance with an example embodiment.

FIG. 5A is a flowchart of a process for providing secure communications in accordance with an example embodiment. Process 500 illustrated in FIG. 5 may be performed to provide secure communications within a network, such as network 100 in FIG. 1. Process 500 may be used to provide secure satellite communications in the user plane, the control and management plane, or both.

In one illustrative example, process 500 may be used to communicate user data (i.e., user traffic) from a satellite (e.g., a satellite in aerial or space vehicle system 102 in FIG. 1) to a destination satellite (e.g., another satellite in aerial or space vehicle system 102). In another example, process 500 is used to communicate user data from a satellite (e.g., a satellite in aerial or space vehicle system 102 in FIG. 1) to a ground operations center (e.g., ground operations center 104 in FIG. 1). In particular, the user data may be processed by the general network operations center (e.g., general network operations center 128 in FIG. 1) and forwarded to an external network (e.g., a secure operations center such as secure operations center 106 in FIG. 1). In yet another illustrative example, process 500 is used for sending telemetry data collected by a satellite (e.g., a satellite in aerial or space vehicle system 102 in FIG. 1) to the satellite operations center of a ground operations center (e.g., satellite operations center 131 in FIG. 1) for processing or forwarding to the general network operations center of the ground operations center.

Process 500 begins by providing a general payload and a hosted payload on a satellite (or a vehicle) (operation 502). In operation 502, each of the general payload and the hosted payload is a distinct physical payload that is independently managed. Each of these payloads includes its own set of physical resources and equipment. The general payload may be managed by a general entity such as, but not limited to, a commercial service provider. The hosted payload is hosted on the same satellite as the general payload but is managed by a secure entity such as, but not limited to, a governmental agency.

A data packet containing restricted data is encrypted by the hosted payload using a secure key to create an encrypted packet (operation 504). The secure key originates from and is managed by the secure entity. In some cases, the secure key is used to provide a highest level of security (e.g., Type-1 security).

The data packet includes a body, a secure header, and a general header. Operation 504 may be performed by, for example, encrypting the data packet such that the body and secure header are encrypted but the general header remains unencrypted. The restricted data in the data packet may be user data (e.g., mission data) or telemetry data. The user data may be data that was received from a secure user terminal (e.g., a secure smartphone). The telemetry data may be data collected by the satellite (or the vehicle) itself.

The encrypted packet is then encrypted by the general payload using a general key to create a double-encrypted packet (operation 506). The general key originates from and is managed by the general entity. The general key is used to provide a lower level of security than the secure key (e.g., Type-2 security).

In some illustrative examples, the encryption in operation 506 is performed by encrypting the encrypted packet using the general key such that the body and secure header are double-encrypted, and the general header remains unencrypted. In these examples, although the general header remains unencrypted, the general header may be updated (e.g., undergo a network translation function or some other type of processing). For example, addresses in the general header corresponding to a secure IP address space may be converted to a commercial IP address space.

In other illustrative examples, the encryption in operation 506 includes encrypting the body, the secure header, and the general header using the general key. An outer header is then added to the double-encrypted packet in which the outer header remains unencrypted. In these examples, there may or may not be translation of the address fields or other processing of the fields in the general header prior to encryption.

The double-encrypted packet is then transmitted from the satellite (or the vehicle) to a destination (operation 508), with the process terminating thereafter. The destination may be referred to as a terminating point in some examples. When the restricted data is user data or mission data, the destination may be another satellite (or another vehicle), a secure user terminal in communication with this other satellite, or a network operations center such as general network operations center 128 in FIG. 1. When the restricted data comprises telemetry data, the destination is typically a satellite operations center, such as satellite operations center 131 in FIG. 1.

Figure 5B:
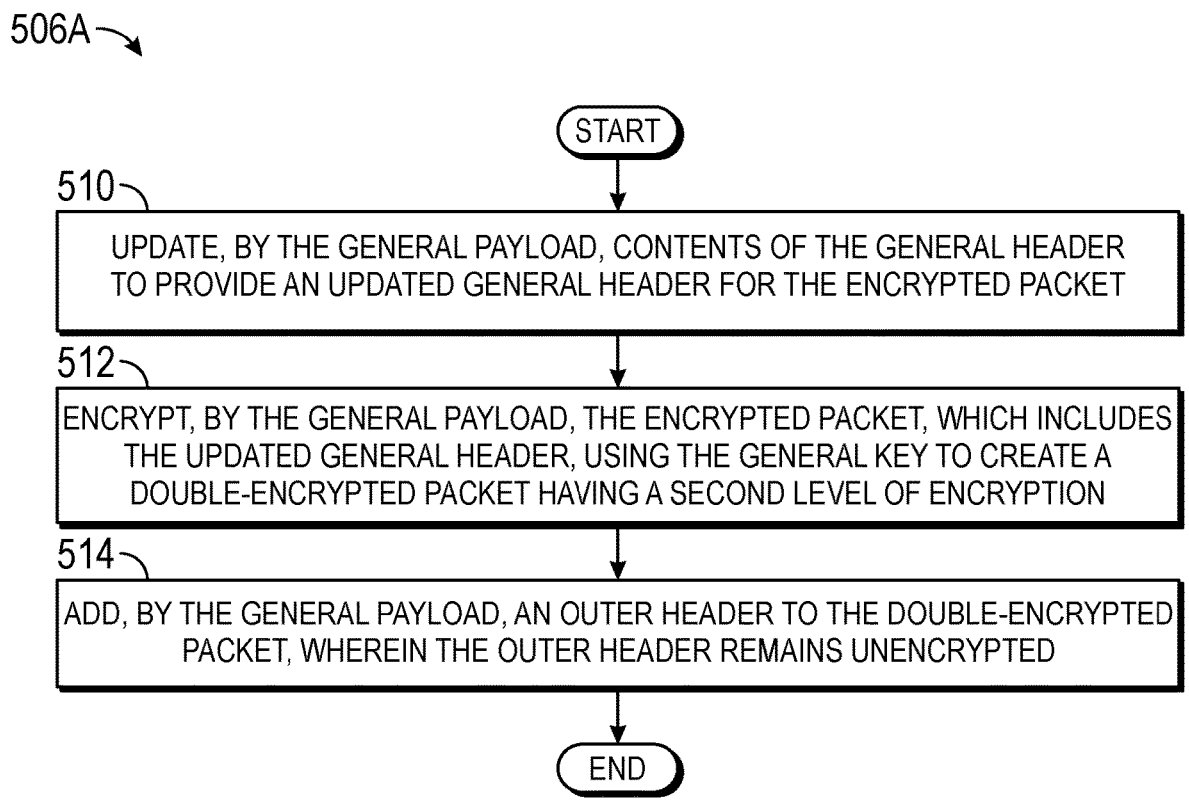
FIG. 5B is a flowchart of a process for encrypting an encrypted packet in accordance with an example embodiment.

FIG. 5B is a flowchart of a process for encrypting an encrypted packet in accordance with an example embodiment. Process 506A is an example of one implementation for operation 506 in FIG. 5A. In other words, process 506A is an example of one manner in which an encrypted packet may be encrypted to create a double-encrypted packet.

Process 506A begins by updating, by the general payload, contents of the general header to provide an updated general header for the encrypted packet (operation 510). This updating may include updating one or more fields of the general header to ensure that the data will be routed to the correct destination. For example, some type of network translation of the general header may be performed to convert between a secure IP address space and a general IP address space (or between a secure Ethernet address space and a general Ethernet space).

Thereafter, the encrypted packet, which includes the updated general header, is encrypted by the general payload using the general key to create a double-encrypted packet having a second level of encryption (operation 512). The general payload then adds an outer header to the double-encrypted packet, wherein the outer header remains operation (operation 514), with the process terminating thereafter. In other illustrative examples, process 506B may be repeated any number of times in a manner similar to that described above to add one or more additional layers or levels of encryption.

Figure 5C:
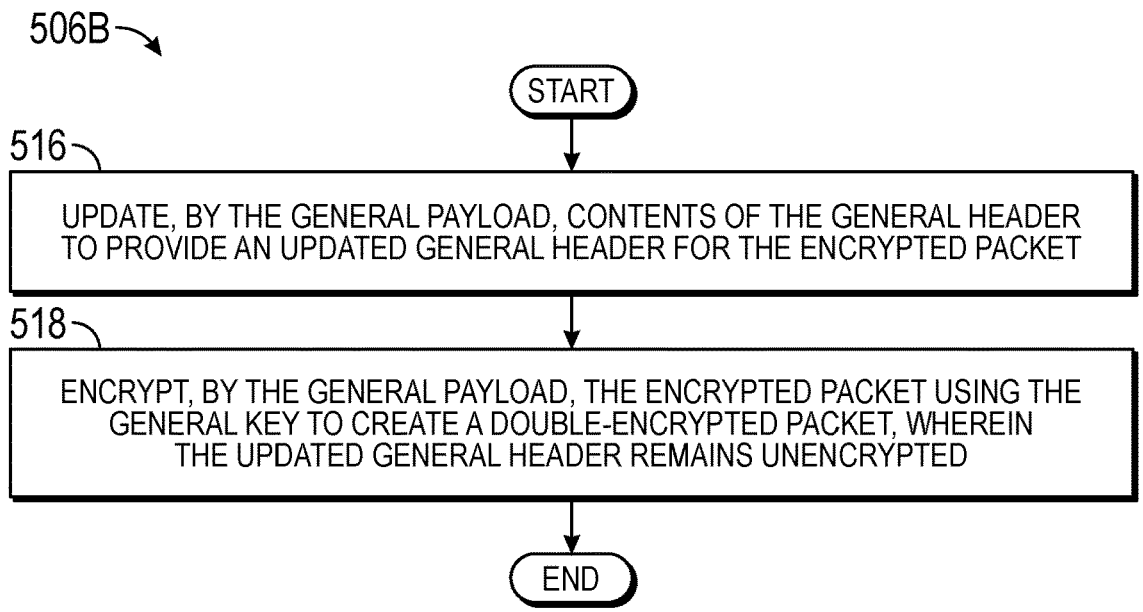
FIG. 5C is a flowchart of another process for encrypting an encrypted packet in accordance with an example embodiment.

FIG. 5C is a flowchart of another process for encrypting an encrypted packet in accordance with an example embodiment. Process 506B is another example of one implementation for operation 506 in FIG. 5A. In other words, process 506B is an example of one manner in which an encrypted packet may be encrypted to create a double-encrypted packet.

Process 506B begins by updating, by the general payload, contents of the general header to provide an updated general header for the encrypted packet (operation 516). This updating may include updating one or more fields of the general header to ensure that the data will be routed to the correct destination. For example, some type of network translation of the general header may be performed to convert between a secure IP address space and a general IP address space (or between a secure Ethernet address space and a general Ethernet space).

Thereafter, the general payload encrypts the encrypted packet using the general key to create a double-encrypted packet, wherein the updated general header remains unencrypted (operation 518), with the process terminating thereafter. Thus, unlike process 506A in FIG. 5B, an outer header is not needed for process 506B. In other illustrative examples, process 506C may be repeated any number of times in a manner similar to that described above to add one or more additional layers or levels of encryption.

Figure 5D:
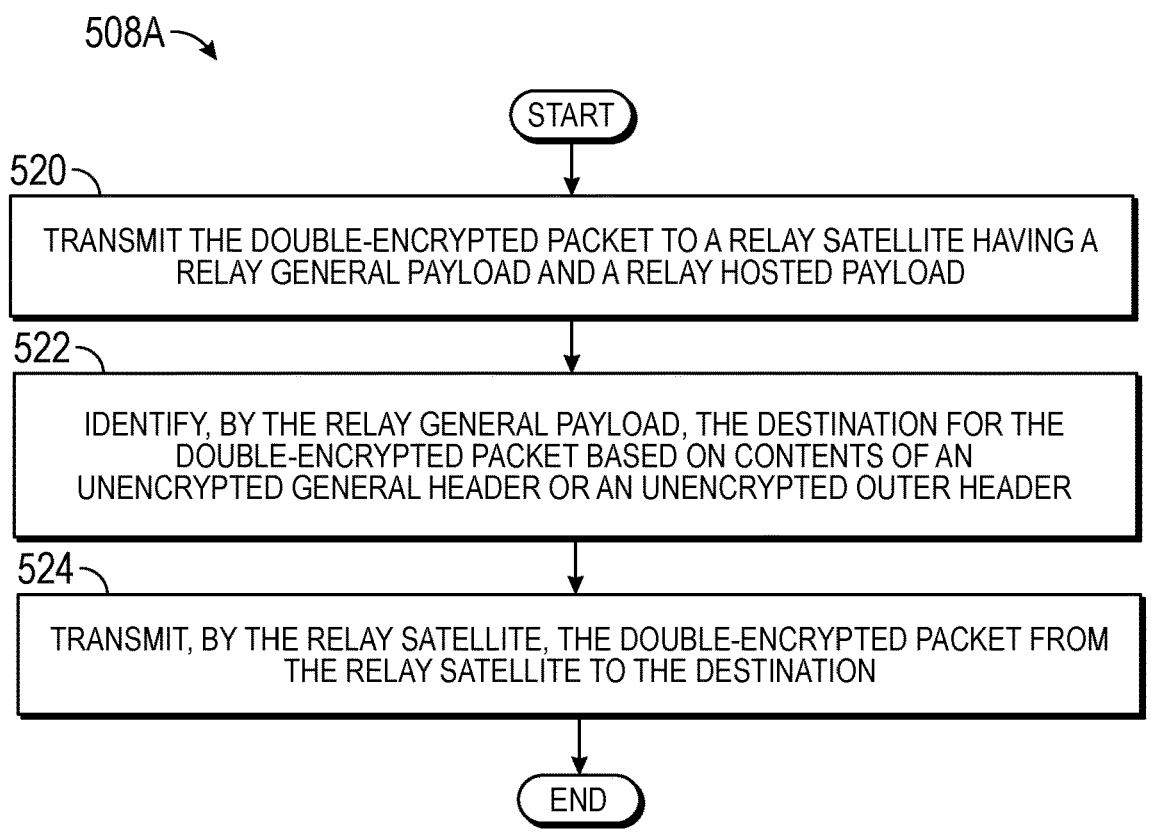
FIG. 5D is a flowchart of a process for transmitting a double-encrypted packet from a satellite to a destination in accordance with an example embodiment.

FIG. 5D is a flowchart of a process for transmitting a double-encrypted packet from a satellite to a destination in accordance with an example embodiment. Process 508A is an example of one implementation for operation 506 in FIG. 5A. Process 508A may be an example implementing operation 508 in FIG. 5 using, for example, a relay satellite (or a relay vehicle).

Process 508A begins by transmitting the double-encrypted packet to a relay satellite having a relay general payload and a relay hosted payload (operation 520). The double-encrypted packet may take the form of, for example, double-encrypted packet 310 or double-encrypted packet 312 described in FIGS. 3-4. Accordingly, the double-encrypted packet may have an unencrypted general header or an unencrypted outer header.

The relay general payload identifies the destination for the double-encrypted packet based on contents of the unencrypted general header or the unencrypted outer header (operation 522). The relay satellite then transmits the double-encrypted packet from the relay satellite to the destination (operation 524), with the process terminating thereafter.

Figure 6:
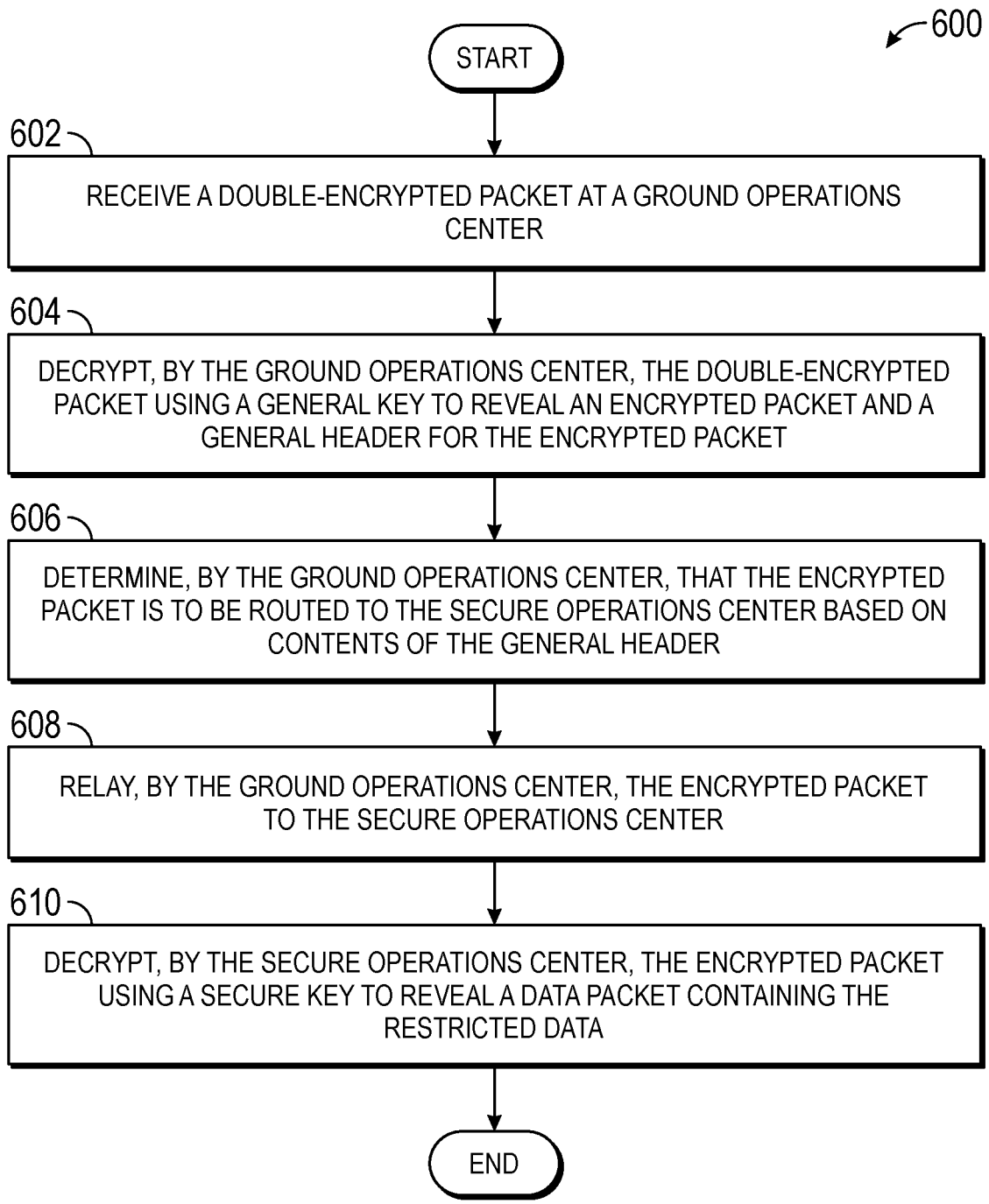
FIG. 6 is a flowchart of a process for receiving secure communications at a ground operations center and a secure operations center in accordance with an example embodiment.

FIG. 6 is a flowchart of a process for receiving secure communications at a ground operations center and a secure operations center in accordance with an example embodiment. Process 600 illustrated in FIG. 6 may be performed by, for example, ground operations center 104 and secure operations center 106 in FIG. 1.

Process 600 begins by receiving a double-encrypted packet at the ground operations center (operation 602). In operation 602, the double-encrypted packet may be the double-encrypted packet created via process 500 in FIG. 5A and, in particular, either process 506A in FIG. 5B or process 506B in FIG. 5C. The ground operations center decrypts the double-encrypted packet using a general key to reveal an encrypted packet and a general header for the encrypted packet (operation 604).

Thereafter, the ground operations center determines that the encrypted packet is to be routed to the secure operations center based on contents of the general header (operation 606). In operation 606, this determination is made based on the various fields included in the general header. The contents may include an n-tuple of fields. In one illustrative example, the contents of the general header may be a 5-tuple that includes a source Internet Protocol (IP) or Ethernet address, a destination IP or Ethernet address, a source port, a destination port, and protocol.

The encrypted packet is then relayed by the ground operations center to the secure operations center (operation 608). The secure operations center decrypts the encrypted packet using a secure key to reveal a data packet containing the restricted data (operation 610), with the process terminating thereafter.

Figure 7:
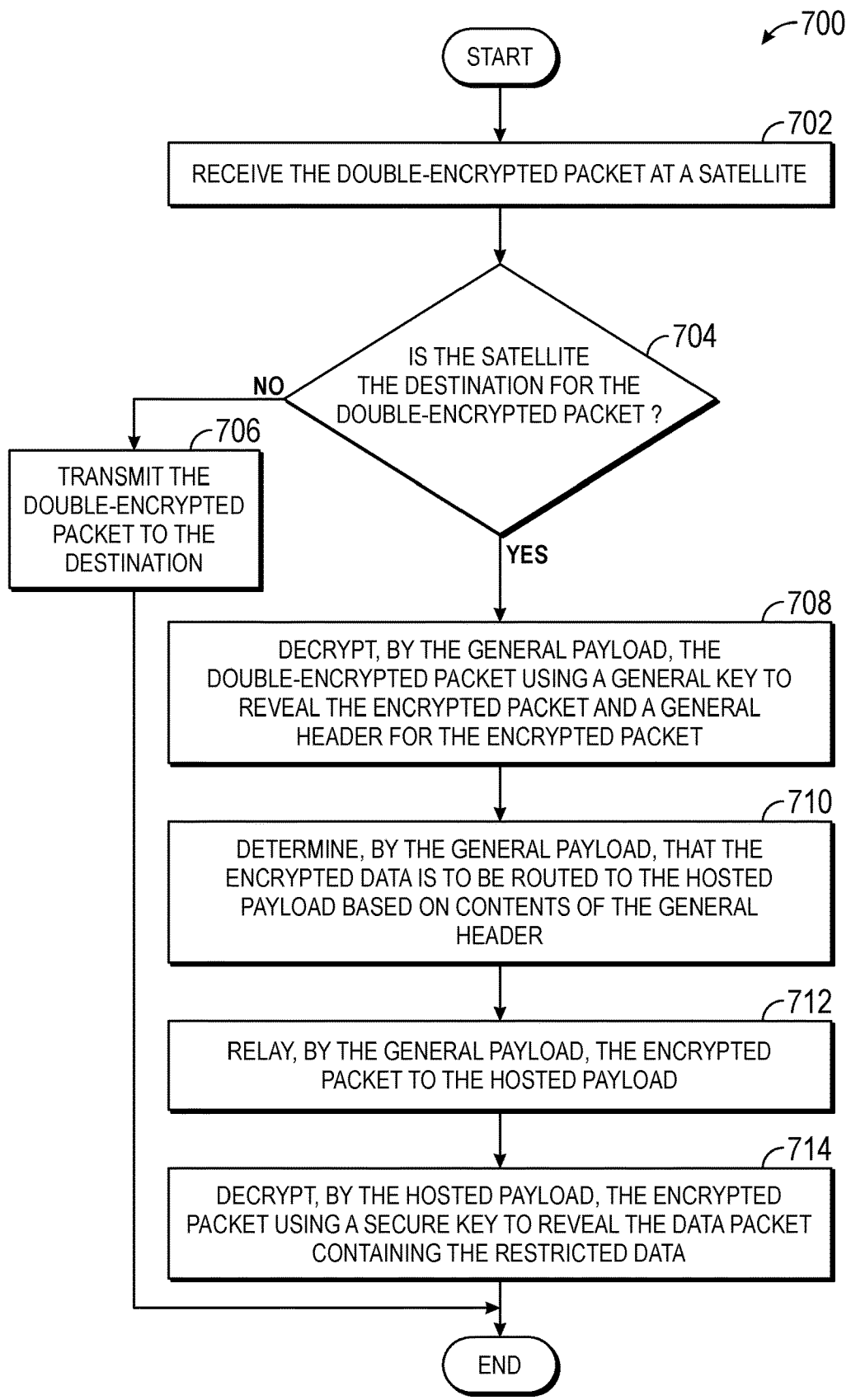
FIG. 7 is a flowchart of a process for receiving secure communications at a satellite in accordance with an example embodiment.

FIG. 7 is a flowchart of a process for receiving secure communications at a satellite in accordance with an example embodiment. Process 700 illustrated in FIG. 7 may be performed to provide secure communications within a network, such as network 100 in FIG. 1. In particular, process 700 may be performed by a satellite, such as a satellite in aerial or space vehicle system 102 in FIG. 1.

Process 700 begins by receiving the double-encrypted packet at a satellite (operation 702). The satellite includes a general payload and a hosted payload. The satellite may be a destination for the double-encrypted packet or just a relay satellite for relaying the double-encrypted packet to the appropriate destination.

In this illustrative example, where the satellite is a destination for the double-encrypted packet, the general payload and the hosted payload may also be referred to as a destination general payload and a destination hosted payload, respectively. Where the satellite is a relay satellite, the general payload and the hosted payload may also be referred to as a relay general payload and a relay hosted payload, respectively.

A determination is made as to whether the satellite is a destination for the double-encrypted packet (operation 704). If the satellite is not the destination, the double-encrypted packet is transmitted to the destination (operation 706), with the process terminating thereafter. Otherwise, if the satellite is the destination, the general payload decrypts the double-encrypted packet using a general key to reveal the encrypted packet and a general header for the encrypted packet (operation 708).

The general payload determines that the encrypted data is to be routed to the hosted payload based on contents of the general header (operation 710). The general payload then relays (e.g., routes) the encrypted packet to the hosted payload (operation 712). The hosted payload decrypts the encrypted packet using a secure key to reveal the data packet containing the restricted data (operation 714), with the process terminating thereafter.

Figure 8:
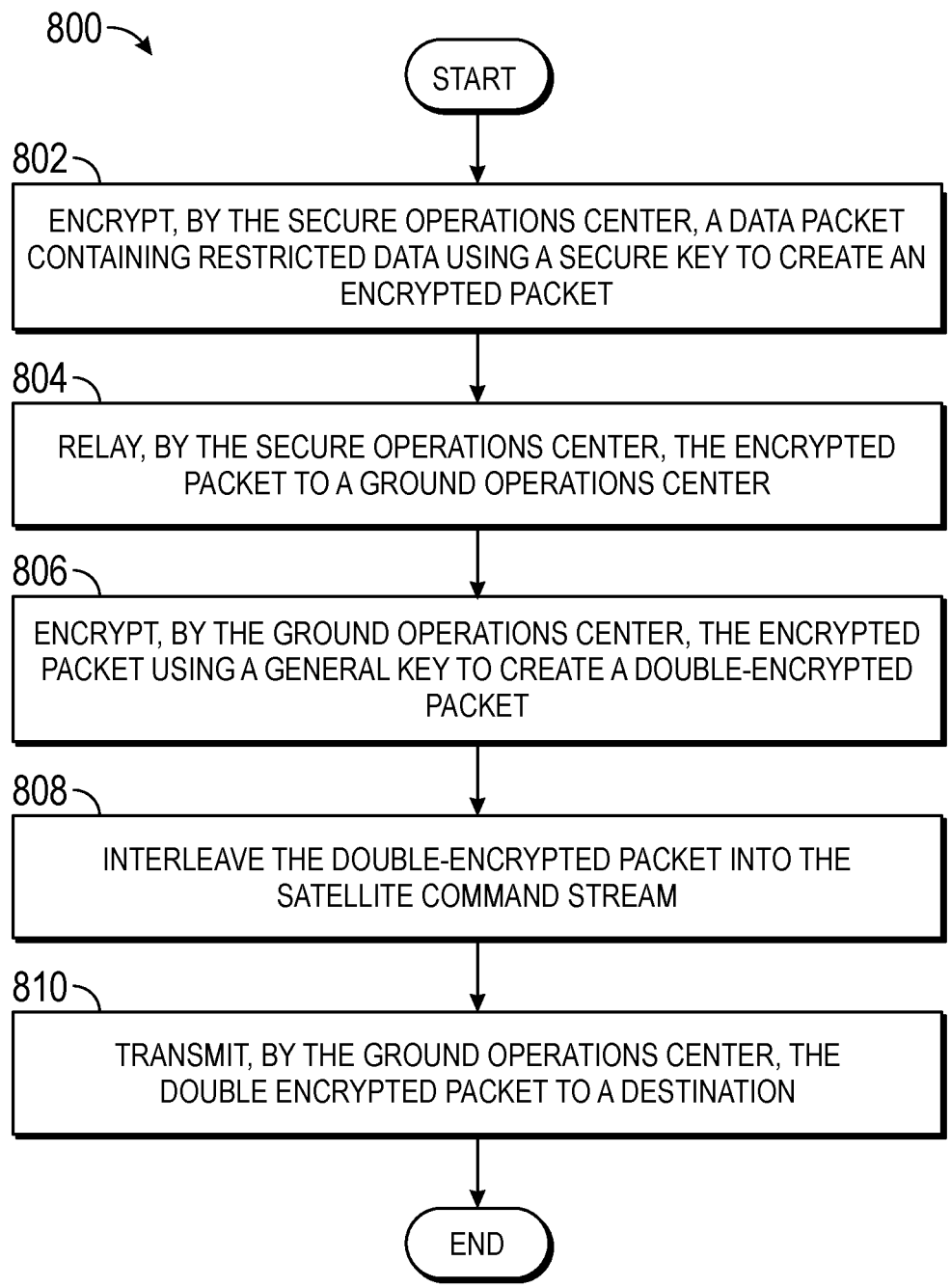
FIG. 8 is a flowchart of a process for transmitting secure communications from ground in accordance with an example embodiment.

FIG. 8 is a flowchart of a process for transmitting secure communications from ground in accordance with an example embodiment. Process 800 illustrated in FIG. 8 may be performed to transmit secure communications from a secure operations center on ground through a satellite system.

Process 800 begins by encrypting, by the secure operations center, a data packet containing restricted data using a secure key to create an encrypted packet (operation 802). The secure operations center relays the encrypted packet to a ground operations center (operation 804). In operation 804, the encrypted packet may be relayed to a general network operations center at the ground operations center.

The ground operations center encrypts the encrypted packet using a general key to create a double-encrypted packet (operation 806). Next, the double-encrypted packet is interleaved into the satellite command stream (operation 808). The ground operations center transmits the double-encrypted packet to a destination (operation 810), with the process terminating thereafter. The destination may be, for example, a satellite. Operation 806, operation 808, and operation 810 may be performed by the general network operations center at the ground operations center.

Figure 9:
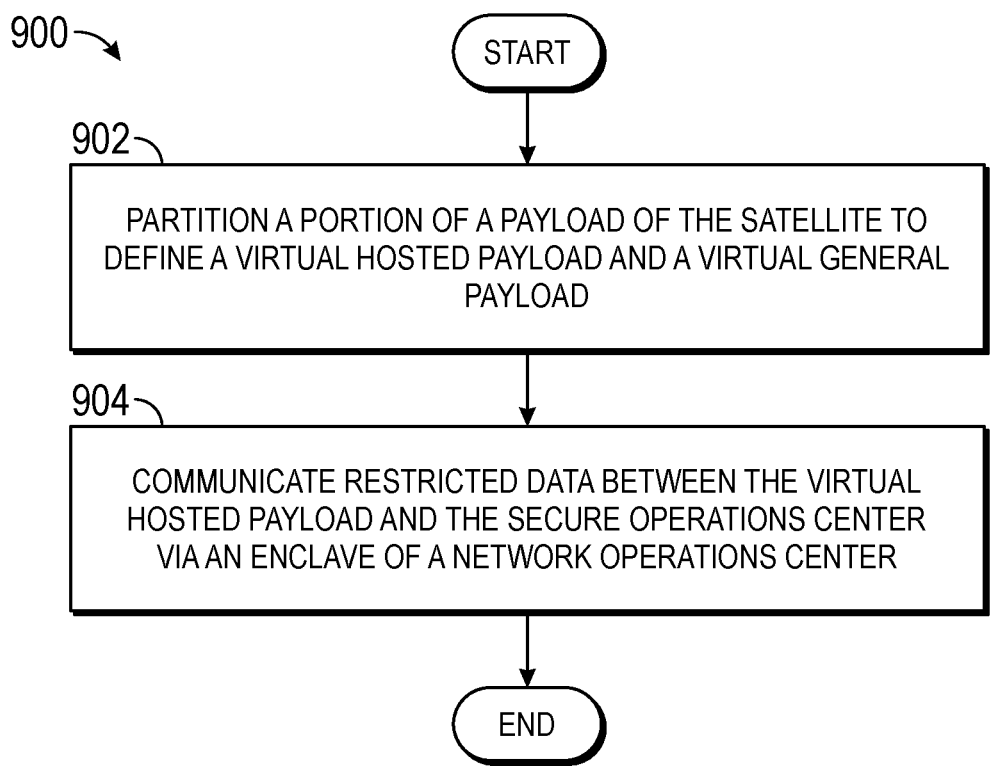
FIG. 9 is a flowchart of a process for providing secure communications in accordance with an example embodiment.

FIG. 9 is a flowchart of a process for providing secure communications in accordance with an example embodiment. Process 900 illustrated in FIG. 9 may be performed to provide secure communications within a network, such as network 100 in FIG. 1. In particular, process 900 may be used to provide secure satellite communications.

Process 900 begins by partitioning a portion of a payload of the satellite to define a virtual hosted payload and a virtual general payload (operation 902). Restricted data is communicated between the virtual hosted payload and the secure operations center via an enclave of a ground operations center (operation 904), with the process terminating thereafter.

Operation 904 may be performed in different ways. In one illustrative example, the secure operations center encrypts a data packet containing restricted data using a secure key to create an initial encrypted packet. The secure operations center relays the initial encrypted packet to the enclave. The enclave decrypts the initial encrypted packet to reveal the data packet. The enclave parses the data packet and re-encrypts the data packet using a general key to create a final encrypted packet. The ground operations center then transmits the final encrypted packet to its destination.

In another illustrative example, in operation 904, the enclave receives an encrypted packet from the satellite. The enclave decrypts the encrypted packet using a general key to reveal a data packet. The enclave parses the data packet and then re-encrypts the data packet using a secure key to create a new encrypted packet. The enclave relays the new encrypted packet to the secure operations center.

Figure 10:
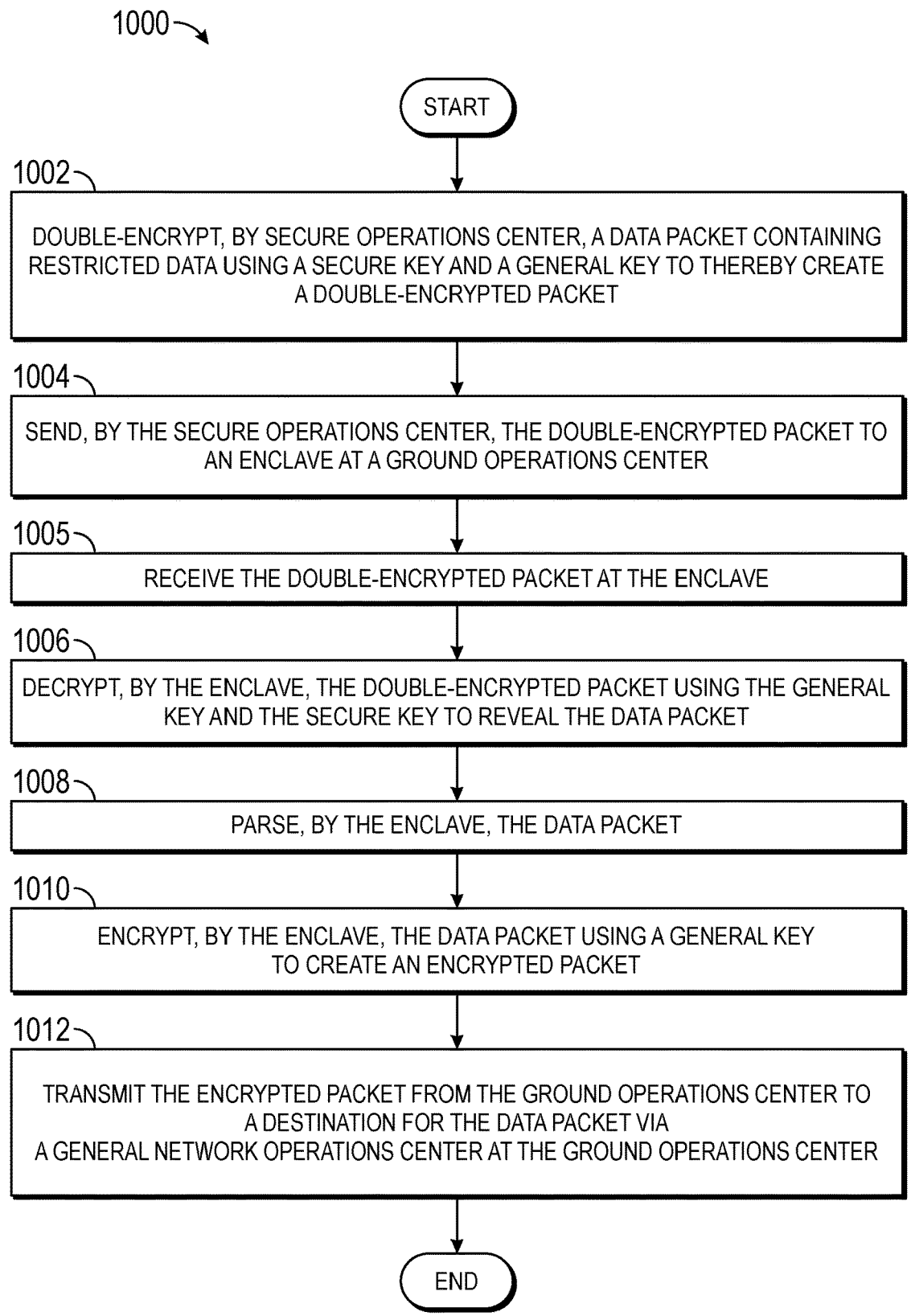
FIG. 10 is a flowchart of a process for exchanging restricted data between a secure operations center and a satellite in accordance with an example embodiment.

FIG. 10 is a flowchart of a process for exchanging restricted data between a secure operations center and a satellite in accordance with an example embodiment. Process 1000 illustrated in FIG. 10 may be performed to provide secure communications within a network, such as network 100 in FIG. 1. In particular, process 1000 may be used to send restricted data from a secure operations center to a destination via a network, such as network 200 in FIG. 2.

Process 1000 begins by double-encrypting, by the secure operations center, a data packet containing restricted data using a secure key and a general key to thereby create a double-encrypted packet (operation 1002). Next, the secure operations center sends the double-encrypted packet to an enclave at a ground operations center (operation 1004). The double-encrypted packet is received at the enclave (operation 1005).

The enclave decrypts the double-encrypted packet using the general key and the secure key to reveal the data packet (operation 1006). The enclave then parses the data packet (operation 1008). Operation 1008 is performed so that the enclave can identify a destination for the data packet. The enclave encrypts the data packet using a general key to create an encrypted packet (operation 1010).

The enclave then transmits the encrypted packet from the ground operations center to a destination for the data packet via a general network operations center at the ground operations center (operation 1012), with the process terminating thereafter. For example, in operation 1012, the enclave may relay the encrypted packet to the general network operations center, which then interleaves the encrypted packet into a satellite stream to send the encrypted packet to a satellite (or a user device associated with the satellite).

Figure 11:
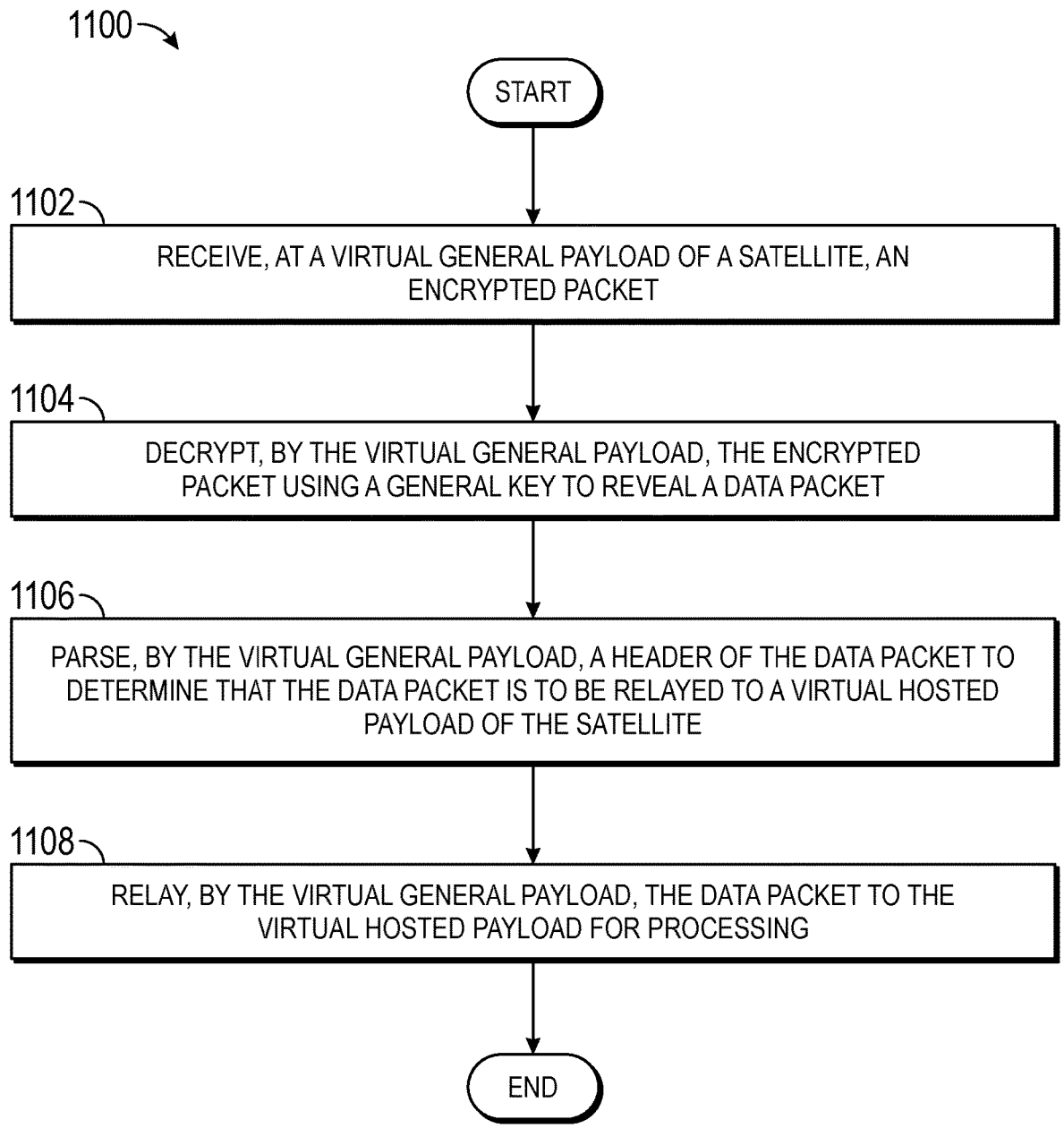
FIG. 11 is a flowchart of a process for receiving and processing an encrypted packet at a satellite in a trusted network in accordance with an example embodiment.

FIG. 11 is a flowchart of a process for receiving and processing an encrypted packet at a satellite in a trusted network in accordance with an example embodiment. Process 1100 illustrated in FIG. 11 may be performed to receive and process an encrypted packet such as the encrypted packet formed and transmitted by process 1000 in FIG. 10. Further, process 1100 may be implemented using a payload partitioned into a virtual general payload and a virtual hosted payload, such as payload 214, payload 216, or payload 218 in FIG. 2.

Process 1100 begins by receiving, at a virtual general payload of a satellite, an encrypted packet (operation 1102).

The virtual general payload decrypts the encrypted packet using a general key to reveal a data packet (operation 1104). The virtual general payload parses a header of the data packet to determine that the data packet is to be relayed to a virtual hosted payload of the satellite (operation 1106). The virtual general payload then relays the data packet to the virtual hosted payload for processing (operation 1108), with the process terminating thereafter.

Figure 12:
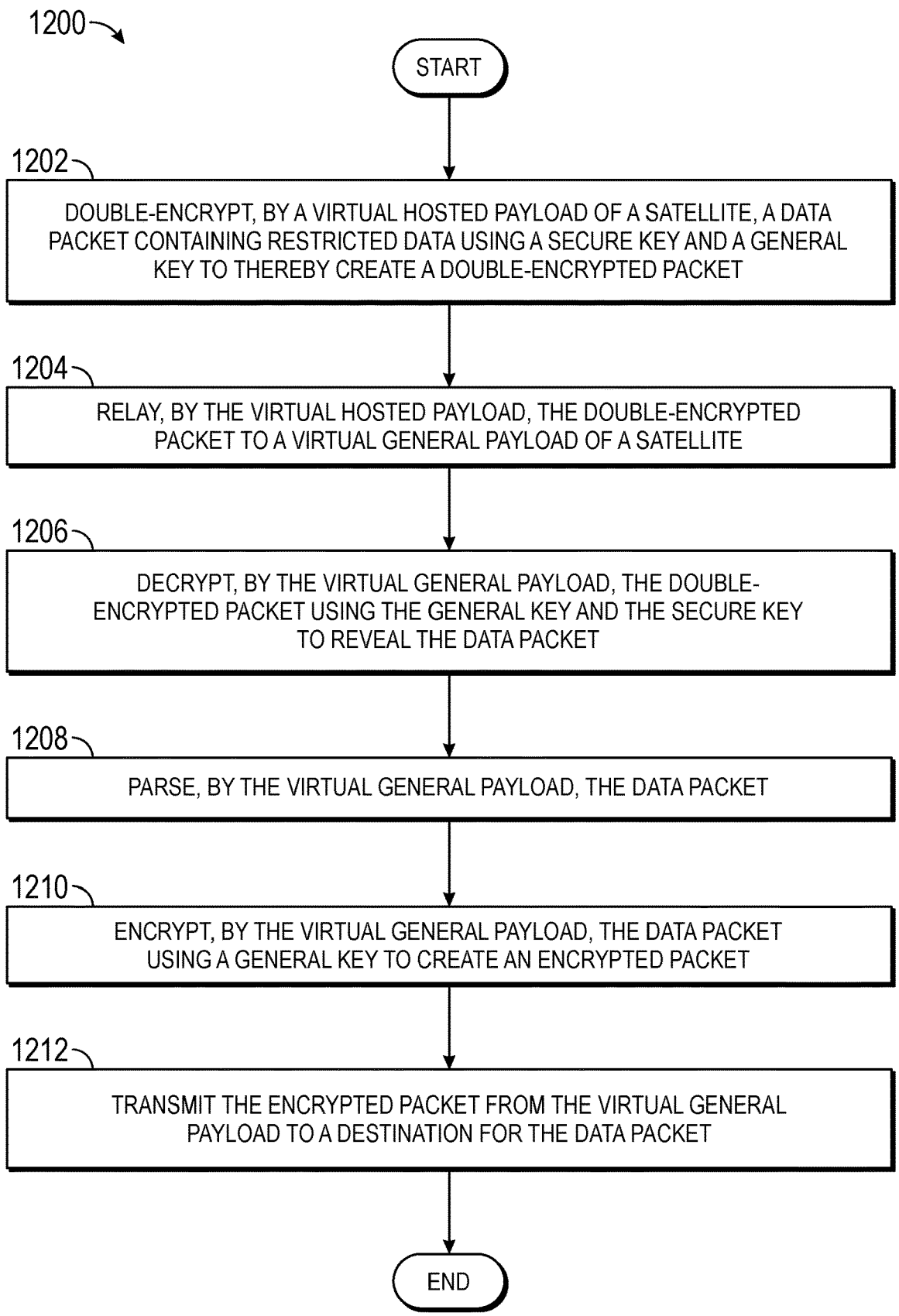
FIG. 12 is a flowchart of a process for transmitting restricted data from a satellite in a trusted network in accordance with an example embodiment.

FIG. 12 is a flowchart of a process for transmitting restricted data from a satellite in a trusted network in accordance with an example embodiment. Process 1200 illustrated in FIG. 12 may be performed by a satellite, such as one of the satellites in satellite system 202 in FIG. 2.

Process 1200 begins by double-encrypting, by a virtual hosted payload of a satellite, a data packet containing restricted data using a secure key and a general key to thereby create a double-encrypted packet (operation 1202). Next, the virtual hosted payload relays the double-encrypted packet to a virtual general payload of the satellite (operation 1204). The double-encrypted packet is decrypted by the virtual general payload using the general key and the secure key to reveal the data packet (operation 1206).

The virtual general payload parses the data packet (operation 1208). The virtual general payload then encrypts the data packet using a general key to create an encrypted packet (operation 1210). The encrypted packet is then transmitted from the virtual general payload to a destination for the encrypted packet (operation 1212), with the process terminating thereafter.

In other illustrative examples, the process 1200 does not include operation 1202. Rather, operation 1202 may be replaced by an encryption operation in which the virtual hosted payload encrypts the data packet using a secure key to form an encrypted packet. In these examples, operation 1206 involves decrypting the encrypted packet using only the secure key.

Figure 13:
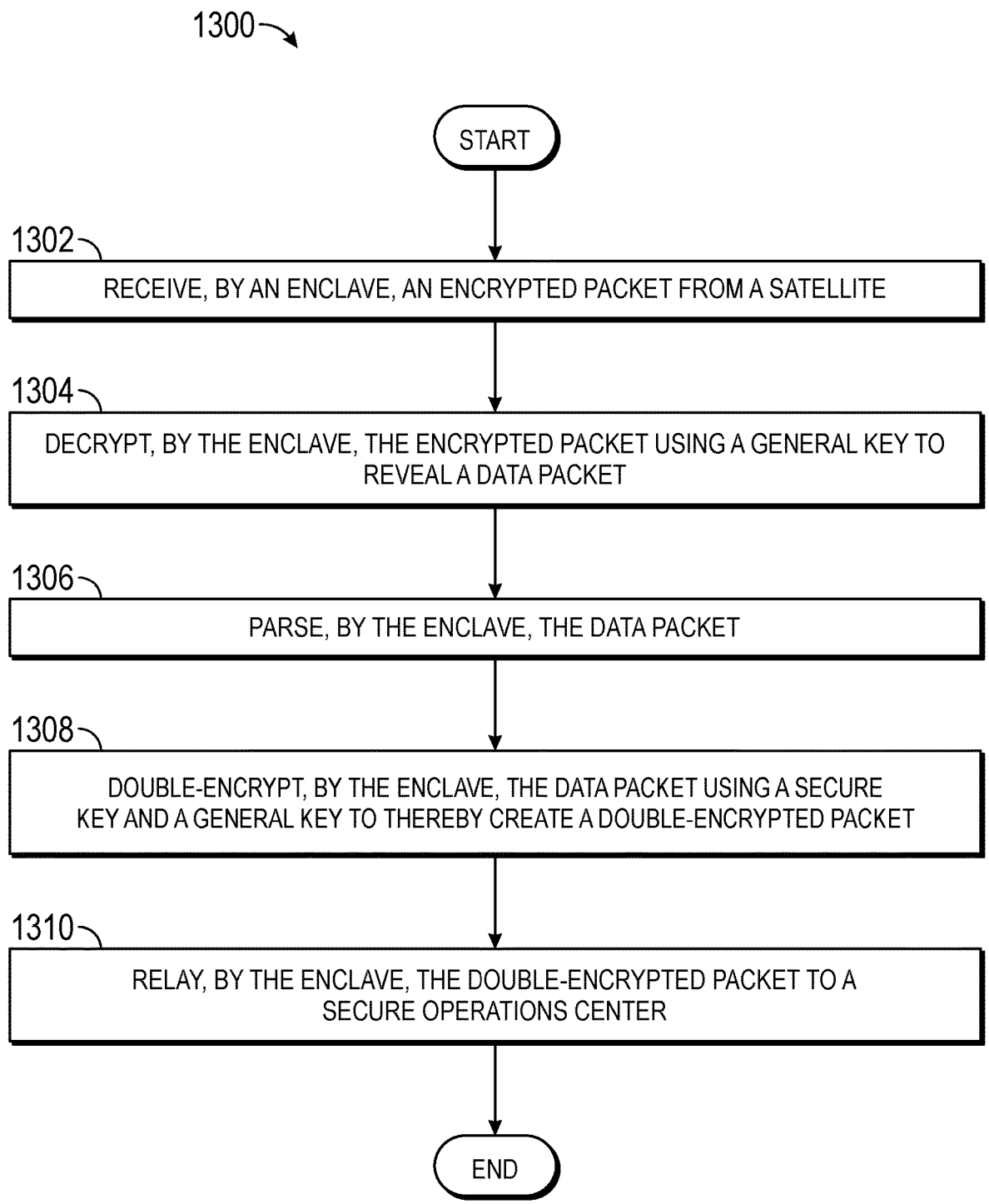
FIG. 13 is a flowchart of a process for receiving and processing an encrypted packet at a ground operations center in accordance with an example embodiment.

FIG. 13 is a flowchart of a process for receiving and processing an encrypted packet at a ground operations center in accordance with an example embodiment. Process 1300 illustrated in FIG. 13 may be performed at a ground operations center, such as ground operations center 204 in FIG. 2. In particular, process 1300 may be performed by enclave 235 of ground operations center 204 in FIG. 2.

Process 1300 begins by receiving, at an enclave, an encrypted packet from a satellite (operation 1302). In operation 1302, the encrypted packet may be received at the enclave by way of a satellite operations center when the encrypted packet contains telemetry data or by way of a general network operations center when the encrypted packet contains user data or mission data.

The enclave then decrypts the encrypted packet using a general key to reveal a data packet (operation 1304). The enclave parses the data packet (operation 1306). Next, the enclave double-encrypts the data packet using a secure key and a general key to thereby create a double-encrypted packet (operation 1308). The enclave relays the double-encrypted packet to a secure operations center (operation 1310), with the process terminating thereafter.

Figure 14:
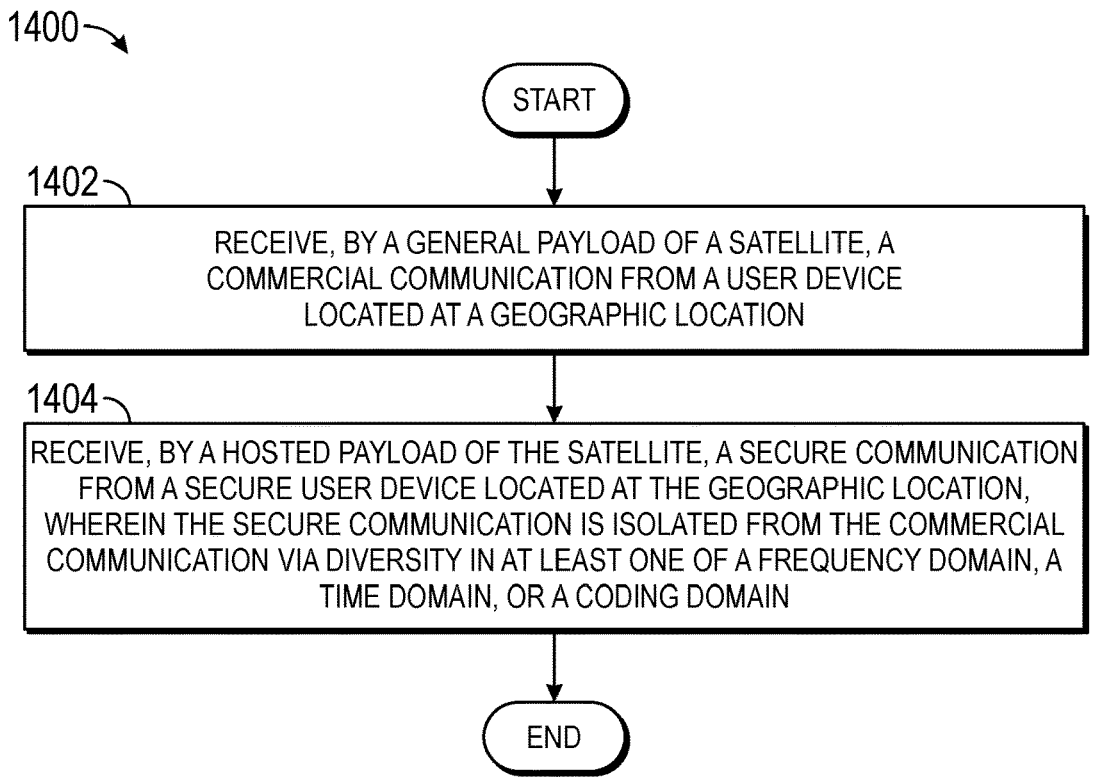
FIG. 14 is a flowchart of a process for receiving communications from geographically co-located user devices at a satellite in accordance with an example embodiment.

FIG. 14 is a flowchart of a process for receiving communications from geographically co-located user devices at a satellite in accordance with an example embodiment. Process 1400 may be implemented using a satellite, such as one of the satellites in aerial or space vehicle system 102 in FIG. 1 or satellite system 202 in FIG. 2.

Process 1400 includes receiving, by a general payload of a satellite, a commercial communication from a user device located at a geographic location (operation 1402). Process 1400 further includes receiving, by the hosted payload, a secure communication from a secure user device located at the geographic location, wherein the secure communication is isolated from the commercial communication via diversity in at least one of a frequency domain, a time domain, or a coding domain (operation 1404).

Figure 15:
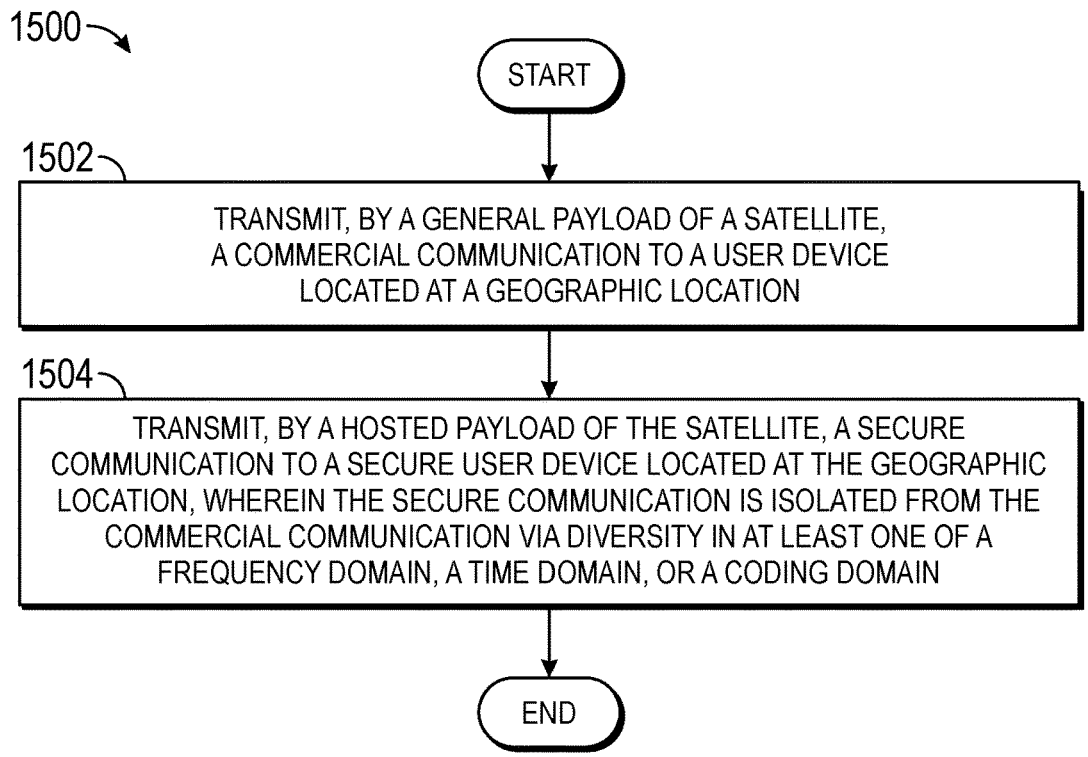
FIG. 15 is a flowchart of a process for sending communications from a satellite to geographically co-located user devices in accordance with an example embodiment.

FIG. 15 is a flowchart of a process for sending communications from a satellite to geographically co-located user devices in accordance with an example embodiment. Process 1500 may be implemented using a satellite, such as one of the satellites in aerial or space vehicle system 102 in FIG. 1 or satellite system 202 in FIG. 2.

Process 1500 includes transmitting, by a general payload of a satellite, a commercial communication to a user device located at a geographic location (operation 1502). Process 1500 further includes transmitting, by a hosted payload of the satellite, a secure communication to a secure user device located at the geographic location, wherein the secure communication is isolated from the commercial communication via diversity in at least one of a frequency domain, a time domain, or a coding domain (operation 1504).

The flowcharts and block diagrams in the different depicted embodiments illustrate the architecture, functionality, and operation of some possible implementations of systems and methods in an example embodiment. In this regard, each block in the flowcharts or block diagrams may represent a module, a segment, a function, and/or a portion of an operation or step.

In some alternative implementations of an example embodiment, the function or functions noted in the blocks may occur out of the order noted in the figures. For example, in some cases, two blocks shown in succession may be executed substantially concurrently, or the blocks may sometimes be performed in the reverse order, depending upon the functionality involved. Also, other blocks may be added in addition to the illustrated blocks in a flowchart or block diagram.

As used herein, the phrase "at least one of," when used with a list of items, means different combinations of one or more of the listed items may be used and only one of the items in the list may be needed. The item may be a particular object, thing, step, operation, process, or category. In other words, "at least one of" means any combination of items or number of items may be used from the list, but not all of the items in the list may be required. For example, without limitation, "at least one of item A, item B, or item C" or "at least one of item A, item B, and item C" may mean item A; item A and item B; item B; item A, item B, and item C; item B and item C; or item A and C. In some cases, "at least one of item A, item B, or item C" or "at least one of item A, item B, and item C" may mean, but is not limited to, two of item A, one of item B, and ten of item C; four of item B and seven of item C; or some other suitable combination.

Thus, the example embodiments described above provide methods and systems for easily and efficiently providing commercial and secure communications at the same time using physical or virtual hosted payloads. A method is provided for enabling commercial mobile networking infrastructure (satellite or cellular) to be federated in order to provide services that employ commercial-grade security and, in parallel, also provide government-grade security. In the satellite domain, separate commercial payloads and hosted payloads are used to allow secure entities to provide secure communications services using a commercial network of satellites.

Additionally, terrestrial cellular and Wi-Fi services and federated satellite services that do not employ a hosted payload architecture may be supported. The methods and systems described above for using double-encryption for secure communications may be adapted for carrying secure traffic over a commercial terrestrial cellular or Wi-Fi network. The same double-encryption processes may be used without the involvement of satellites. Further, the methods and systems described above for defining virtual hosted payloads may be applied to allow commercial operators to harvest stranded network resources for sale or lease to value-added resellers. These commercial operators may be satellite network operators or terrestrial cellular or Wi-Fi operators.

Further, although certain example embodiments are described above with respect to satellites, similar systems and methods may be implemented with respect to aerial vehicles and aerospace vehicles. For example, an aerial vehicle, manned or unmanned, may include a general payload and a hosted payload for use in enabling secure communications. As another example, an aerial vehicle may have a payload partitioned to have a virtual general payload and a virtual hosted payload that enable secure communications.

The description of the different example embodiments has been presented for purposes of illustration and description, and is not intended to be exhaustive or limited to the embodiments in the form disclosed. Many modifications and variations will be apparent to those of ordinary skill in the art. Further, different example embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method for providing secure aerial or space communications, the method comprising:
providing a general payload and a hosted payload on a vehicle;
encrypting, by the hosted payload, a data packet that contains restricted data using a secure key to create an encrypted packet;
encrypting, by the general payload, the encrypted packet using a general key to create a multilayer-encrypted packet; and
transmitting the multilayer-encrypted packet from the vehicle to a destination;
wherein the data packet comprises a body, a secure header, and a general header and wherein encrypting, by the hosted payload, the data packet comprises:
encrypting, by the hosted payload, the body and the secure header of the data packet using the secure key to create the encrypted packet having a first level of encryption, wherein the general header remains unencrypted;
wherein encrypting, by the general payload, the encrypted packet comprises at least one of operation (A) or operation (B) wherein:
operation (A) comprises:
encrypting, by the general payload, the encrypted packet, which includes the general header, using the general key to create the multilayer-encrypted packet having a second level of encryption; and
adding, by the general payload, an outer header to the multilayer-encrypted packet, wherein the outer header remains unencrypted;
operation (B) comprises:
updating, by the general payload, contents of the general header to provide a first updated general header for the encrypted packet; and
encrypting, by the general payload, the encrypted packet using the general key to create the multilayer-encrypted packet having the second level of encryption, wherein the first updated general header remains unencrypted.

2. The method of claim 1, wherein:
the vehicle is part of a network, and the transmitting comprises transmitting the multilayer-encrypted packet over the network; and
the method further comprises:
receiving the multilayer-encrypted packet at the destination, wherein the destination is a ground operations center;
decrypting, by the ground operations center, the multilayer-encrypted packet using the general key to reveal the encrypted packet and the general header for the encrypted packet; and
communicating, by the hosted payload, with a first terminal remote from the vehicle and connected to the network at the hosted payload.

3. The method of claim 2, further comprising:
determining, by the ground operations center, that the encrypted packet is to be relayed to a secure operations center based on contents of the general header;
relaying, by the ground operations center, the encrypted packet to the secure operations center;
decrypting, by the secure operations center, the encrypted packet to reveal the data packet; and
communicating, by the general payload, with a second terminal remote from the vehicle and connected to the network at the general payload.

4. The method of claim 1, further comprising:
receiving the multilayer-encrypted packet at the destination, wherein the destination is a destination satellite comprising a destination general payload and a destination hosted payload; and
decrypting, by the destination general payload, the multilayer-encrypted packet using the general key to reveal the encrypted packet and the general header for the encrypted packet.

5. The method of claim 4, further comprising:
determining, by the destination general payload, that the encrypted packet is to be routed to the destination hosted payload based on contents of the general header; and
relaying, by the destination general payload, the encrypted packet to the destination hosted payload.

6. The method of claim 5, further comprising:
decrypting, by the destination hosted payload, the encrypted packet using the secure key to reveal the data packet.

7. The method of claim 1, wherein encrypting, by the general payload, the encrypted packet comprises operation (A).

8. The method of claim 7, wherein operation (A) comprises:
updating, by the general payload, contents of the general header to provide a second updated general header for the encrypted packet prior to encrypting the encrypted packet.

9. The method of claim 7, wherein transmitting the multilayer-encrypted packet from the vehicle to the destination comprises:
transmitting, by the general payload, the multilayer-encrypted packet to a relay satellite having a relay general payload and a relay hosted payload;
identifying by the relay general payload, the destination for the multilayer-encrypted packet based on contents of the unencrypted outer header; and
transmitting, by the relay satellite, the multilayer-encrypted packet from the relay satellite to the destination.

10. The method of claim 7, wherein each of the general and hosted payloads comprises physical resources and equipment used by the vehicle to perform communications.

11. The method of claim 1, wherein encrypting, by the general payload, the encrypted packet comprises operation (B).

12. The method of claim 11, wherein transmitting the multilayer-encrypted packet from the vehicle to the destination comprises:
transmitting, by the general payload, the multilayer-encrypted packet to a relay satellite having a relay general payload and a relay hosted payload;
identifying by the relay general payload, the destination for the multilayer-encrypted packet based on contents of the unencrypted first updated general header; and
transmitting, by the relay satellite, the multilayer-encrypted packet from the relay satellite to the destination.

13. The method of claim 1, further comprising:
receiving, at the general payload, a commercial communication from a user device located at a geographic location; and
receiving, at the hosted payload, a secure communication from a secure user device located at the geographic location, wherein the secure communication is isolated from the commercial communication via diversity in at least one of a frequency domain, a time domain, or a coding domain.

14. A method for providing secure aerial or space communications, the method comprising:
receiving at a satellite having a general payload and a hosted payload, a multilayer-encrypted packet;
decrypting, by the general payload, multilayer-encrypted packet using a general key to reveal an encrypted packet and a general header for the encrypted packet;
determining, by the general payload, that the encrypted packet is to be routed to the hosted payload based on contents of the general header;
relaying, by the general payload, the encrypted packet to the hosted payload; and
decrypting, by the hosted payload, the encrypted packet using a secure key to reveal a data packet containing restricted data;
wherein the multilayer-encrypted packet was created by a process comprising:
encrypting the data packet containing the restricted data using the secure key to create the encrypted packet; and
encrypting the encrypted packet using the general key to create the multilayer-encrypted packet;
wherein the data packet comprises a body, a secure header, and the general header and wherein encrypting the data packet comprises:
encrypting the body and the secure header of the data packet using the secure key to create the encrypted packet having a first level of encryption, wherein the general header remains unencrypted; and
wherein encrypting the encrypted packet comprises:
encrypting the encrypted packet, which includes the general header, using the general key to create the multilayer-encrypted packet having a second level of encryption; and
adding an outer header to the multilayer-encrypted packet, wherein the outer header remains unencrypted.

15. The method of claim 14, wherein:
encrypting the data packet to create the encrypted packet is performed by a secure operations center; and
encrypting the encrypted packet to create the multilayer-encrypted packet is performed by a ground operations center.

16. The method of claim 1, wherein each of the general and hosted payloads comprises physical resources and equipment used by the vehicle to perform communications.

17. A system comprising:
a vehicle comprising:
a hosted payload holding a secure key for a first level of encryption and decryption; and
a general payload holding a general key for a second level of encryption and decryption;
wherein the secure key is only accessible on the vehicle by the hosted payload;
a secure operations center holding the secure key, wherein the hosted payload of the vehicle and the secure operations center exchange restricted data using multilayer encryption and
a ground operations center that holds the general key, wherein all data is transmitted to and from the secure operations center through the ground operations center;
wherein the secure operations center uses the secure key to create an encrypted packet having a first level of encryption and the ground operations center uses the general key to encrypt the encrypted packet, thereby creating a multilayer-encrypted packet having a second level of encryption; and
wherein the multilayer-encrypted packet is a double-encrypted packet that includes an outer header that is unencrypted, an encrypted general header, a double-encrypted secure header, and a double-encrypted body.

18. The system of claim 17, wherein each of the general and hosted payloads comprises physical resources and equipment used by the vehicle to perform communications.

19. The system of claim 17, wherein the secure key is originated by and disseminated by a secure entity and wherein the general key is originated by and disseminated by a commercial entity.

20. The system of claim 17, further comprising:
a user device at a geographic location; and
a secure user device at the geographic location,
wherein communications between the user device and the vehicle and between the secure user device and the vehicle are isolated via diversity in at least one of a frequency domain, a time domain, or a coding domain.

21. A system comprising:
a vehicle comprising:
a hosted payload holding a secure key for a first level of encryption and decryption; and
a general payload holding a general key for a second level of encryption and decryption,
wherein the secure key is only accessible on the vehicle by the hosted payload;

a secure operations center holding the secure key, wherein the hosted payload of the vehicle and the secure operations center exchange restricted data using multilayer encryption; and a ground operations center that holds the general key, wherein all data is transmitted to and from the secure operations center through the ground operations center;

wherein the secure operations center uses the secure key to create an encrypted packet having a first level of encryption and the ground operations center uses the general key to encrypt the encrypted packet, thereby creating a multilayer-encrypted packet having a second level of encryption;

wherein the multilayer-encrypted packet is a double-encrypted packet that includes an updated general header that is unencrypted and a double-encrypted secure header and a double-encrypted body.

22. The system of claim 21, wherein each of the general and hosted payloads comprises physical resources and equipment used by the vehicle to perform communications.

23. A system comprising:
a vehicle having a payload, wherein a portion of the payload is partitioned to define a virtual hosted payload and a virtual general payload;
a ground operations center that includes an enclave; and
a secure operations center, wherein the secure operations center exchanges restricted data with the virtual hosted payload via the enclave of the ground operations center;
wherein the enclave receives an encrypted packet from the vehicle, decrypts the encrypted packet using a general key to reveal a data packet, parses the data packet, double-encrypts the data packet using a secure key and the general key to create a double-encrypted packet, and relays the double-encrypted encrypted packet to the secure operations center.

24. The system of claim 23, wherein the secure operations center encrypts a data packet that contains the restricted data using the secure key to create an initial encrypted packet and relays the initial encrypted packet to the enclave.

25. The system of claim 24, wherein the enclave decrypts the initial encrypted packet to reveal the data packet, parses the data packet, and re-encrypts the data packet using the general key to create a final encrypted packet.

26. The system of claim 25, wherein the ground operations center transmits the final encrypted packet to a destination for the final encrypted packet.

27. The system of claim 23, wherein the payload comprises physical resources and equipment used by the vehicle to perform communications.

28. The system of claim 23, wherein the enclave, the virtual hosted payload, and the secure operations center are managed by a secure entity and wherein the virtual general payload and the ground operations center are managed by a commercial entity.

29. A method for exchanging restricted data between a secure operations center and a satellite, the method comprising:
partitioning a portion of a payload of the satellite to define a virtual hosted payload and a virtual general payload;
communicating the restricted data between the virtual hosted payload and the secure operations center via an enclave of a ground operations center;
receiving, by the enclave, an encrypted packet from the satellite;
decrypting, by the enclave, the encrypted packet using a general key to reveal a data packet;
parsing, by the enclave, the data packet;
double-encrypting, by the enclave, the data packet using a secure key and the general key to create a double-encrypted packet and
relaying, by the enclave, the double-encrypted packet to the secure operations center.

30. The method of claim 29, wherein communicating the restricted data comprises:
double-encrypting, by the secure operations center, a data packet containing the restricted data using the secure key and the general key to thereby create a corresponding double-encrypted packet; and
sending, by the secure operations center, the corresponding double-encrypted packet to the enclave.

31. The method of claim 30, wherein communicating the restricted data further comprises:
decrypting, by the enclave, the corresponding double-encrypted packet to reveal the data packet containing the restricted data;
parsing, by the enclave, the data packet containing the restricted data; and
encrypting, by the enclave, the data packet containing the restricted data using the general key to create a corresponding encrypted packet.

32. The method of claim 31, wherein communicating the restricted data further comprises:
transmitting the corresponding encrypted packet from the ground operations center to a destination for the corresponding encrypted packet via a general network operations center at the ground operations center.

33. The method of claim 29, wherein the payload of the satellite comprises physical resources and equipment used by the satellite to perform communications.

* * * * *